United States Patent
Zihir et al.

(10) Patent No.: US 10,998,931 B2
(45) Date of Patent: *May 4, 2021

(54) TRANSMIT-RECEIVE SWITCH WITH INTEGRATED POWER DETECTION

(71) Applicant: Integrated Device Technology, Inc., San Jose, CA (US)

(72) Inventors: Samet Zihir, San Diego, CA (US); Tumay Kanar, San Diego, CA (US); Himanshu Khatri, San Diego, CA (US)

(73) Assignee: Integrated Device Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/737,180

(22) Filed: Jan. 8, 2020

(65) Prior Publication Data

US 2020/0295798 A1 Sep. 17, 2020

Related U.S. Application Data

(63) Continuation of application No. 16/354,650, filed on Mar. 15, 2019, now Pat. No. 10,536,186.

(51) Int. Cl.
*H04B 1/40* (2015.01)
*H04B 17/00* (2015.01)
*H04B 1/44* (2006.01)
*H04B 7/10* (2017.01)

(52) U.S. Cl.
CPC ............ *H04B 1/44* (2013.01); *H04B 7/10* (2013.01)

(58) Field of Classification Search
CPC ... H04B 1/44; H04B 1/40; H04B 7/10; H04B 17/11; H04B 17/15; H04B 17/29; H04B 15/00; H04W 24/02; H04W 24/08
See application file for complete search history.

(56) References Cited

U.S. PATENT DOCUMENTS

| | | | |
|---|---|---|---|
| 7,889,023 B2 | 2/2011 | Mun | 333/101 |
| 9,054,756 B2 | 6/2015 | See | |
| 10,536,186 B1 * | 1/2020 | Zihir | H04B 1/18 |
| 2005/0099227 A1 | 5/2005 | Kim | 330/51 |
| 2008/0055016 A1 | 3/2008 | Morris | 333/129 |
| 2010/0327969 A1 | 12/2010 | Jung | 330/124 R |
| 2012/0146425 A1 | 6/2012 | Lee | 307/104 |
| 2013/0265107 A1 | 10/2013 | Holmes | 330/124 R |
| 2014/0354508 A1 | 12/2014 | Lee | 343/860 |
| 2016/0134260 A1 | 5/2016 | Bhutta | 333/32 |
| 2017/0093364 A1 | 3/2017 | Shi | |
| 2017/0345620 A1 | 11/2017 | Coumou | |

* cited by examiner

*Primary Examiner* — Andrew Wendell
(74) *Attorney, Agent, or Firm* — Christopher P. Maiorana, PC

(57) ABSTRACT

An apparatus includes a transmit-receive switch circuit and a detector circuit. The transmit-receive switch circuit may be connected between an input port, an output port, and a common port, and configured to switch a transmit radio-frequency signal from the input port to the common port in a transmit mode and a receive radio-frequency signal from the common port to the output port in a receive mode. The detector circuit may be integrated within the transmit-receive switch and may be configured to generate a power detection signal in response to at least one of the transmit radio-frequency signal or the receive radio-frequency signal.

20 Claims, 16 Drawing Sheets

TRANSMIT-RECEIVE SWITCH WITH INTEGRATED POWER DETECTION

This application relates to U.S. Ser. No. 16/354,650, filed Mar. 15, 2019, which is incorporated by reference in its entirety.

FIELD OF THE INVENTION

The invention relates to wireless communications circuit design generally and, more particularly, to a method and/or apparatus for implementing a transmit-receive switch with integrated power detection.

BACKGROUND

Conventional power detectors are used to monitor output power of transmit signals generated by transceiver systems operating in a transmit mode. The power detectors are also used to monitor received signals in a receive mode where a strength of the received signal is high enough. Typically the power detectors are located either after a power amplifier or after a transmit-receive switch. Designs of separate power detector blocks usually consume significant chip area and introduce extra loss, depending on the topology. The power detectors are also constrained by system specifications such that the power detectors do not affect performance when placed in signal paths.

It would be desirable to implement a transmit-receive switch with integrated power detection.

SUMMARY

The invention concerns an apparatus includes a transmit-receive switch circuit and a detector circuit. The transmit-receive switch circuit may be connected between an input port, an output port, and a common port, and configured to switch a transmit radio-frequency signal from the input port to the common port in a transmit mode and a receive radio-frequency signal from the common port to the output port in a receive mode. The detector circuit may be integrated within the transmit-receive switch and may be configured to generate a power detection signal in response to at least one of the transmit radio-frequency signal or the receive radio-frequency signal.

BRIEF DESCRIPTION OF THE FIGURES

Embodiments of the invention will be apparent from the following detailed description and the appended claims and drawings in which:

DETAILED DESCRIPTION OF THE EMBODIMENTS

Embodiments of the present invention include providing a transmit-receive switch with integrated power detection that may (i) occupy a small area on a chip, (ii) monitor transmit signal output power, (iii) monitor receive signal input power, (iv) reduce signal loss during power detection and/or (v) be implemented as one or more integrated circuits.

Various embodiments of the invention generally provide a power detector circuit integrated within a transmit-receive (T/R) switch for sampling of radio-frequency (RF) power. The power detector circuit may implement passive components for impedance matching and may be integrated into any passive or active devices already used in the T/R switch. Updates to the passive and/or active circuits in a common T/R switch to accommodate the power detector circuit may be minimal and little to no area and/or extra loss overhead may be incurred.

Figure 1:
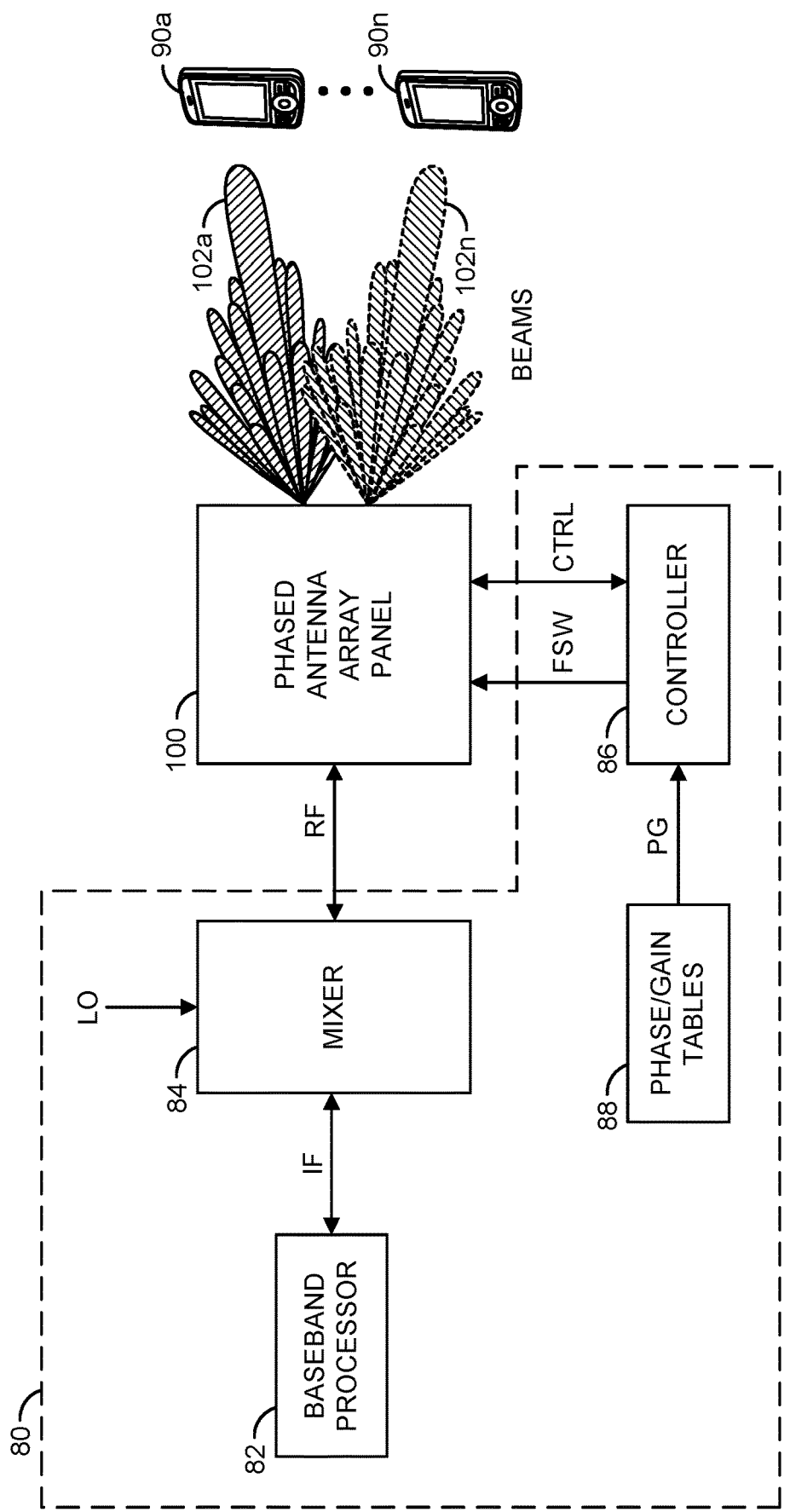
FIG. 1 is a diagram illustrating a system illustrating an example context of the invention.

Referring to FIG. 1, a block diagram illustrating a system 80 is shown illustrating an example context of the invention. The system (or module or circuit or apparatus) 80 may implement an RF transceiver system in accordance with an example embodiment of the invention. The RF transceiver system 80 may be configured to operate at common wireless radio frequencies, millimeter-wave frequencies, and/or microwave frequencies. In an example, the RF transceiver system 80 may be configured to facilitate communication with and/or between a plurality of communications devices (or terminals) 90a-90n. In an example, the communications devices 90a-90n may include, but are not limited to, cellular telephones, mobile devices, tablets, internet-of-things (IoT) equipment, etc. In various embodiments, the RF transceiver system 80 and the communications devices 90a-90n may be coupled using at least one phased array antenna panel 100 in accordance with an example embodiment of the invention.

In an example, the RF transceiver system 80 may form part of a communications link. In some embodiments, the communications link may be part of a fifth generation (5G) wireless communications system (e.g., for which a standard is currently under development by the Next Generation Mobile Networks (NGMN) Alliance). In other embodiments, the communications link may be part of systems including, but not limited to, a fourth generation (4G) wireless communications system (e.g., International Mobile Telecommunications-Advanced (IMT-A) standard published by the International Telecommunications Unit Radio-communication Sector (ITU-R)), a satellite communication (SATCOM) system, and point-to-point communications systems such as common data link (CDL). However, other communications standards may be implemented to meet the design criteria of a particular application.

In an example, the RF transceiver system 80 may comprise a block (or circuit) 82, a block (or circuit) 84, a block (or circuit) 86, and a block (or circuit) 88. In various embodiments, the blocks 82-88 may be implemented with hardware, a combination of hardware and software, and/or simulated with software. A signal (e.g., IF) may be exchanged between the circuit 82 and the circuit 84. The signal IF may implement an intermediate-frequency signal. In an example, the signal IF may be configured (e.g., using various modulation schemes) to carry information to be transmitted from and/or received by the RF transceiver system 80. In an example, a signal (e.g., LO) may be presented to the circuit 84. The signal LO may implement a local oscillator signal. A signal (e.g., RF) may be exchanged between the circuit 84 and the phased array antenna panel 100. The signal RF may be a radio-frequency, millimeter-wave frequency, or microwave frequency signal that conveys the information also found in the intermediate-frequency signal IF.

In a transmit mode, the radio-frequency signal RF may convey information to be broadcast from the phased array antenna panel 100 to the devices 90a-90n. In a receive mode, the radio-frequency signal RF may convey information received from the devices 90a-90n via the phased array antenna panel 100. A signal (e.g., FSW) and a signal or signals (e.g., CTRL) may be exchanged between the circuit 86 and the phased array antenna panel 100. The signal FSW may switch the phased array antenna panel 100 between the transmit mode and the receive mode. The signal(s) CTRL may convey data, clocking, and control elements. In an example, the signals FSW and CTRL may be part of a digital interface of the phased array antenna panel 100. In an example, the signal(s) CTRL may be implemented as a serial link that conveys information for configuring and/or determining phase and gain settings for antenna elements of the phased array antenna panel 100. In an example, the signal(s) CTRL may be compliant with one or more serial communication protocols or interfaces (e.g., serial peripheral interface (SPI), inter-integrated circuit communications (I$^2$C), daisy chain, etc.). A signal or signals (e.g., PG) may be transferred from the circuit 88 to the circuit 86. In an example, the signal(s) PG may convey phase information and gain information used by the circuit 86 to implement (control) beam steering using the phased array antenna panel 100. In an example, the signal(s) PG may convey a plurality of phase and gain valves that may be programmed into a plurality of beam former circuits of the phased array antenna panel 100 via the signal(s) CTRL.

The phased array antenna panel 100 generally implements a hardwired address scheme in accordance with an example embodiment of the invention. The hardwired address scheme may be used to uniquely identify serial communications intended for elements (e.g., the beam former circuits) of the phased array antenna panel 100. In various embodiments, multiple phased array antenna panels 100 may be combined to form a larger antenna array that may provide more transmission channels. The multiple phased array antenna panels may share a serial communication channel, link, or bus. Each of the phased array antenna panels 100 making up the larger antenna array may be uniquely addressed using respective hardwired addresses.

The phased array antenna panel 100 may generate one or more fields (or beams) 102a-102n. The fields 102a-102n may represent a field pattern (or radio-frequency beam pattern) created by the beam former circuits of the phased array antenna panel 100 based upon the phase and gain information (values) received via the signal(s) CTRL. The phased array antenna panel 100 may be configured to produce directional beams 102a-102n for communication with the communication devices 90a-90n. In an example, the phased array antenna panel 100 may be controlled to steer the beams 102a-102n, based on the phase and gain information received via the signal(s) CTRL, to track movement of the communication devices 90a-90n and/or switch between the communication devices 90a-90n.

The circuit 82 may implement a baseband processor circuit. The circuit 82 may be operational to process the information sent by and/or received in the intermediate-frequency signal IF. The circuit 82 may process the information within the RF transceiver system 80. The processing may include, but is not limited to, modulation/demodulation of the signal that contains the information and management of simultaneous communications between the RF transceiver system 80 and the multiple remote terminals 90a-90n.

The circuit 84 may implement one or more mixer circuits. The circuit 84 is generally operational to frequency convert (e.g., up-convert, down-convert, etc.) between an intermediate frequency used for the signal IF and the radio frequency, millimeter-wave frequency, or microwave frequency used for the signal RF. The frequency conversion may be based on one or more local oscillator frequencies provided by the signal LO. In various embodiments, the radio-frequency signal RF may be in a range of frequencies approximately centered around a center frequency of either 28 gigahertz (GHz) or 39 GHz (e.g., 24 GHz to 30 GHz or 37 GHz to 44 GHz). In embodiments implementing multiple intermediate frequencies, each intermediate frequency may cover a band from approximately 2 GHz to about 6 GHz (e.g., an approximately 4 GHz bandwidth). In an example, each local oscillator frequency may range from approximately 22 GHz to 26 GHz when the signal RF is approximately centered at 28 GHz. In another example, each local oscillator frequency may range from approximately 33 GHz to 37 GHz when the signal RF is approximately centered at 39 GHz. However, other frequency ranges may be implemented to meet the design criteria of a particular application.

The circuit 86 may implement a control circuit. In various embodiments, the circuit 86 may be implemented using one or more of an application specific integrated circuit (ASIC), controller, microprocessor, or circuitry configured accordingly. The circuit 86 is generally operational to control the operations of the phased array antenna panel 100. In some embodiments, the circuit 86 may determine the setting values used in each transceiver channel within the beam former circuits of the phased array antenna panel 100. The setting values may establish the geometry of the field(s) or beam(s) 102a-102n. In various embodiments, the circuit 86 may be implemented as one or more integrated circuits.

In an example, the circuit 88 may implement a table of values (e.g., embodied in a memory circuit). In an example, the table of values embodied in the circuit 88 may be configured to store multiple gain (G) values and multiple phase (P) values. The phase and gain values may be used by the transceiver channels in the phased array antenna panel 100 to establish the fields 102a-102b. The phase values and the gain values may be fetched from the circuit 88 via the signal PG and programmed into buffers associated with the beam formers of the phased array antenna panel 100 by the circuit 86. In various embodiments, the circuits 86 and 88 may be implemented either on the same integrated circuit or on different (separate) integrated circuits.

In an example, the phased array antenna panel 100 may be implemented comprising either single-polarization (or single-pole) antenna elements or dual-polarization (or dual-pole or di-pole) antenna elements. The phased array antenna panel 100 may be operational to transmit and receive wireless signals to and from the devices (or terminals) 90a-90n. The devices (or terminals) 90a-90n may be remotely located from the RF transceiver system 80. Sensitivity to the wireless signals may be determined by the fields 102a-102n created by the phased array antenna panel 100. The phased array antenna panel 100 may comprise a plurality of antenna elements and a plurality of beam former circuits. Each beam former circuit may implement a plurality of transceiver channels. Each transceiver channel generally comprises a transmit channel and a receive channel. The transceiver channels may be coupled to the antenna elements by corresponding bidirectional radio-frequency signals. The transceiver channels and antenna elements generally form a two-dimensional antenna network.

Figure 2:
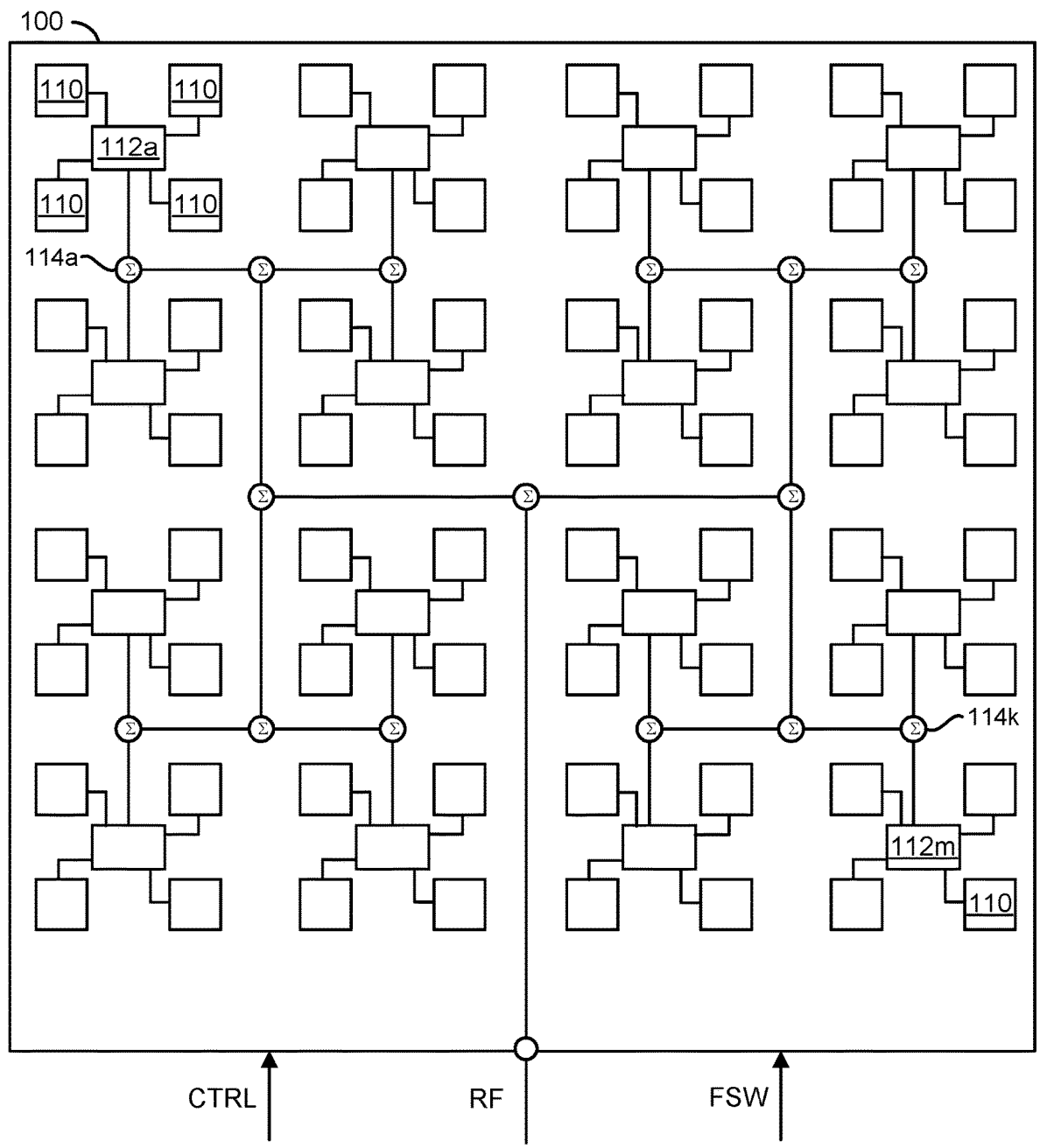
FIG. 2 is a diagram illustrating a single-polarization phased array antenna panel in accordance with an example embodiment of the invention.

Referring to FIG. 2, a diagram illustrating a single-polarization version of the phased array antenna panel 100 is shown in accordance with an example embodiment of the invention. In an example, the phased array antenna panel 100 may comprise a number of blocks (or circuits) 110, a number of blocks (or circuits) 112a-112m, and a number of blocks (or circuits) 114a-114k. In embodiments implementing a single-polarization phased array antenna panel, the blocks 110 generally are implemented as single polarization (or single-pole) antenna elements. Each of the circuits 112a-112m may implement a single-polarization beam former circuit. Each of the circuits 114a-114k may implement a combiner/splitter circuit. The circuits 112a-112m, and 114a-114k may be implemented with hardware, a combination of hardware and software, and/or simulated with software. In an example, the signal RF may be exchanged with one of the circuits 114a-114k. The signal(s) CTRL may be exchanged with the circuits 112a-112m.

The antenna elements 110 in the phased array antenna panel 100 may be used for both transmission and reception. A physical positioning of the antenna elements 110 generally provides for two-dimensional (e.g., horizontal and vertical) control of the fields 102a-102n. In an example, the antenna elements 110 may be arranged in a 2-dimensional (e.g., N×N) grid pattern, where N is an integer value divisible by 2. However, other dimensions of grid patterns may be implemented accordingly to meet design criteria of a particular implementation.

The circuits 112a-112m are generally operational to multiplex/demultiplex the signal RF with a number of the antenna elements 110. In various embodiments, each of the circuits 112a-112m may be mounted on a substrate of the phased array antenna panel 100 adjacent to (e.g., centered among) a number of the antenna elements 110. In an example, each circuit 112a-112m generally comprises a number of transceiver channels that are coupled to respective antenna elements 110. In an example, each circuit 112a-112m may be coupled to four adjacent antenna elements 110 (e.g., arranged in a 2×2 grid around each circuit 112a-112m). The circuits 112a-112m may be configured to switch between a transmit mode and a receive mode in response to the signal FSW. In the transmit mode, the circuits 112a-112m may be operational to rapidly change setting values (e.g., phase values, gain values, etc.) used by the transceiver channels in order to steer the fields 102a-102n formed by the phased array antenna panel 100. In various embodiments, each of the circuits 112a-112m may be implemented as one or more integrated circuits (e.g., in a package or multi-chip module (MCM)).

In various embodiments, each of the circuits 114a-114k may be implemented as a combiner/splitter circuit. In an example, the circuits 114a-114k may be implemented as Wilkinson combiner/splitters. In various embodiments, the circuits 114a-114k may be coupled together to form a network that couples the circuits 112a-112m to an input/output of the phased array antenna panel 100 configured to present/receive the signal RF. In the transmit mode, the circuits 114a-114k are generally operational to distribute the power in the signal RF among the circuits 112a-112m. In the receive mode, the circuits 114a-114k may be operational to combine the power received in signals from the circuits 112a-112m into the signal RF. The circuits 112a-112n and 114a-114k are generally configured to provide a substantially equivalent path length between the RF input/output of the phased array antenna panel 100 and each of the circuits 112a-112m.

Figure 3:
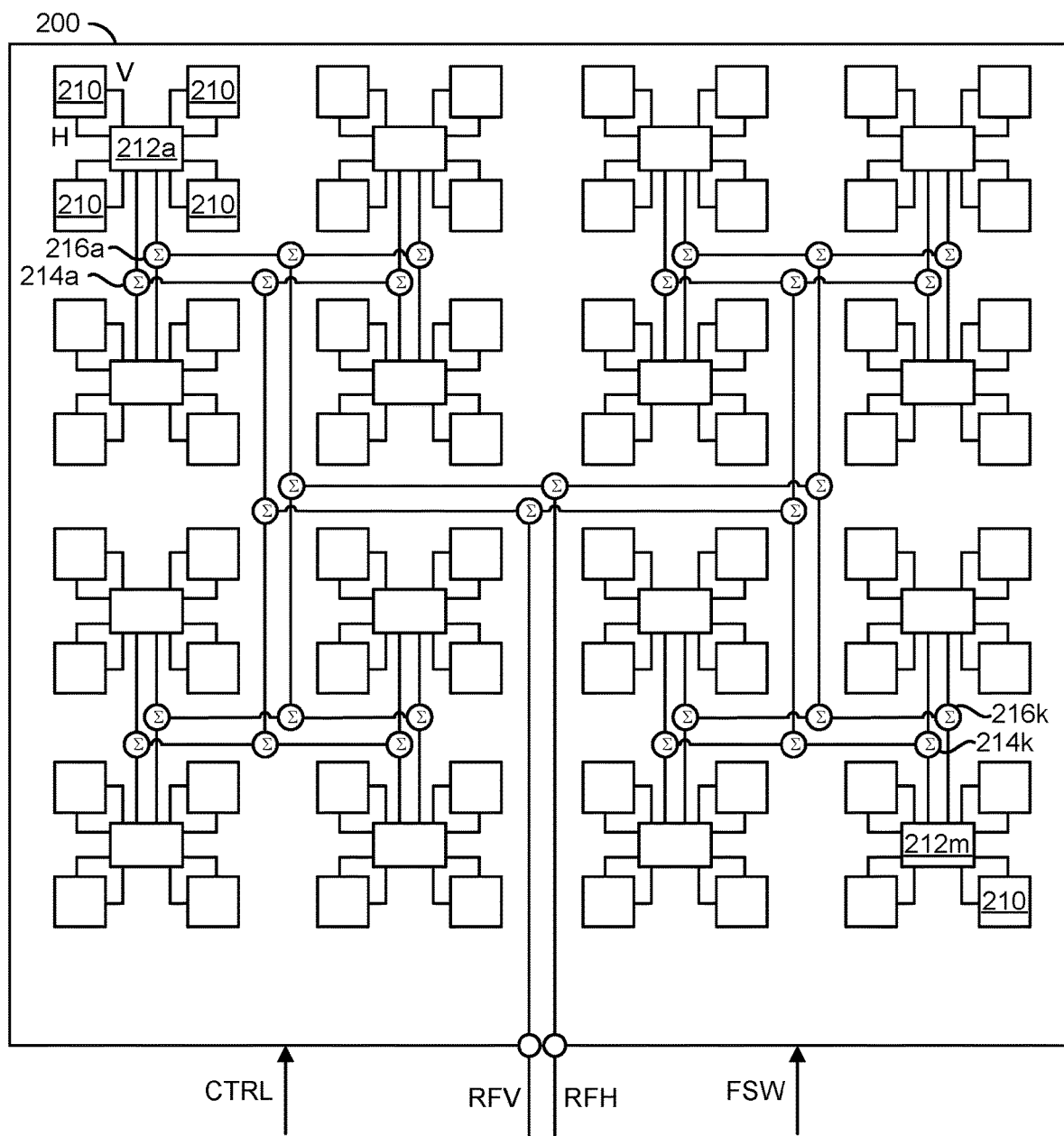
FIG. 3 is a diagram illustrating a dual-polarization phased array antenna panel in accordance with an example embodiment of the invention.

Referring to FIG. 3, a diagram illustrating a dual-polarization phased array antenna panel 200 is shown in accordance with another example embodiment of the invention. In embodiments implementing dual-polarization transceiver channels, the phased array antenna panel 200 may be used in place of the phased array antenna panel 100 of FIG. 1. In an example, the phased array antenna panel 200 may comprise a number of blocks (or circuits) 210, a number of blocks (or circuits) 212a-212m, a number of blocks (or circuits) 214a-214k, and a number of blocks (or circuits) 216a-216k. In embodiments implementing a dual-polarization phased array antenna panel, the blocks 210 generally are implemented as dual-polarization (or dual-pole or di-pole) antenna elements. Each of the circuits 212a-212m may implement a dual-polarization beam former circuit. Each of the circuits 214a-214k and 216a-216k may implement a combiner/splitter circuit. The circuits 212a-212m, 214a-214k, and 216a-216k may be implemented with hardware, a combination of hardware and software, and/or simulated with software. In embodiments implementing the dual-polarization phased array antenna panel 200, the signal RF may comprise a vertical polarized component (e.g., RFV) and a horizontal polarized component (e.g., RFH). In an example, the signal RFV may be exchanged with one of the circuits 214a-214k and the signal RFH may be exchanged with one of the circuits 216a-216k. The signal(s) CTRL may be exchanged with the circuits 212a-212m.

The antenna elements 210 in the phased array antenna panel 200 may be used for both transmission and reception. A physical positioning of the antenna elements 210 generally provides for two-dimensional (e.g., horizontal and vertical) control of the fields 102a-102n. In an example, the antenna elements 210 may be arranged in a 2-dimensional (e.g., N×N) grid pattern, where N is an integer value divisible by 2. However, other dimensions of grid patterns may be implemented accordingly to meet design criteria of a particular implementation.

The circuits 212a-212m are generally operational to multiplex/demultiplex the signals RFV and RFH with a number of the antenna elements 210. In various embodiments, each of the circuits 212a-212m may be mounted on a substrate of the phased array antenna panel 200 adjacent to a number of the antenna elements 210. Each of the circuits 212a-212m may have respective horizontal (H) and vertical (V) input/outputs that may be coupled to corresponding horizontal (H) and vertical (V) input/outputs of the adjacent antenna elements 210. In an example, each circuit 212a-212m generally comprises a number of transceiver channels that are coupled to respective horizontal and vertical input/outputs. In an example, each circuit 212a-212m may be coupled to four adjacent antenna elements 210 (e.g., arranged in a 2×2 grid around each circuit 212a-212m). The circuits 212a-212m may be configured to switch between a transmit mode and a receive mode in response to the signal FSW. In the transmit mode, the circuits 212a-212m may be operational to rapidly change setting values (e.g., phase values, gain values, etc.) used by the transceiver channels in order to steer the fields 102a-102n formed by the phased array antenna panel 200. In various embodiments, each of the circuits 212a-212m may be implemented as one or more integrated circuits (e.g., in a package or multi-chip module (MCM)). In an example, each of the circuits 212a-212m may be mounted on a substrate of the phased array antenna panel 200 adjacent to (e.g., centered among) the respective antenna elements 210.

In various embodiments, each of the circuits 214a-214k and 216a-216k may implement a combiner/splitter circuit. In an example, each of the circuits 214a-214k and 216a-216k may be implemented as a Wilkinson combiner/splitter circuit. The circuits 214a-214k may be coupled together to form a network that couples the circuit 212a-212m to an input/output of the phased array antenna panel 200 configured to present/receive the signal RFV. The circuits 216a-216k may be coupled together to form a network that couples the circuit 212a-212m to an input/output of the phased array antenna panel 200 configured to present/receive the signal RFH. In the transmit mode, the circuits 214a-214k and 216a-216k are generally operational to distribute the power in the signals RFV and RFH, respectively, among the circuits 212a-212m. In the receive mode, the circuits 214a-214k and 216a-216k may be operational to combine the power received in signals from the circuits 212a-212m, respectively, into the signals RFV and RFH. The circuits 212a-212n, 214a-214k, and 216a-216k are generally configured to provide a substantially equivalent path length between the RFV input/output and the RFH input/output of the phased array antenna panel 200 and each of the circuits 212a-212m.

Figure 4:
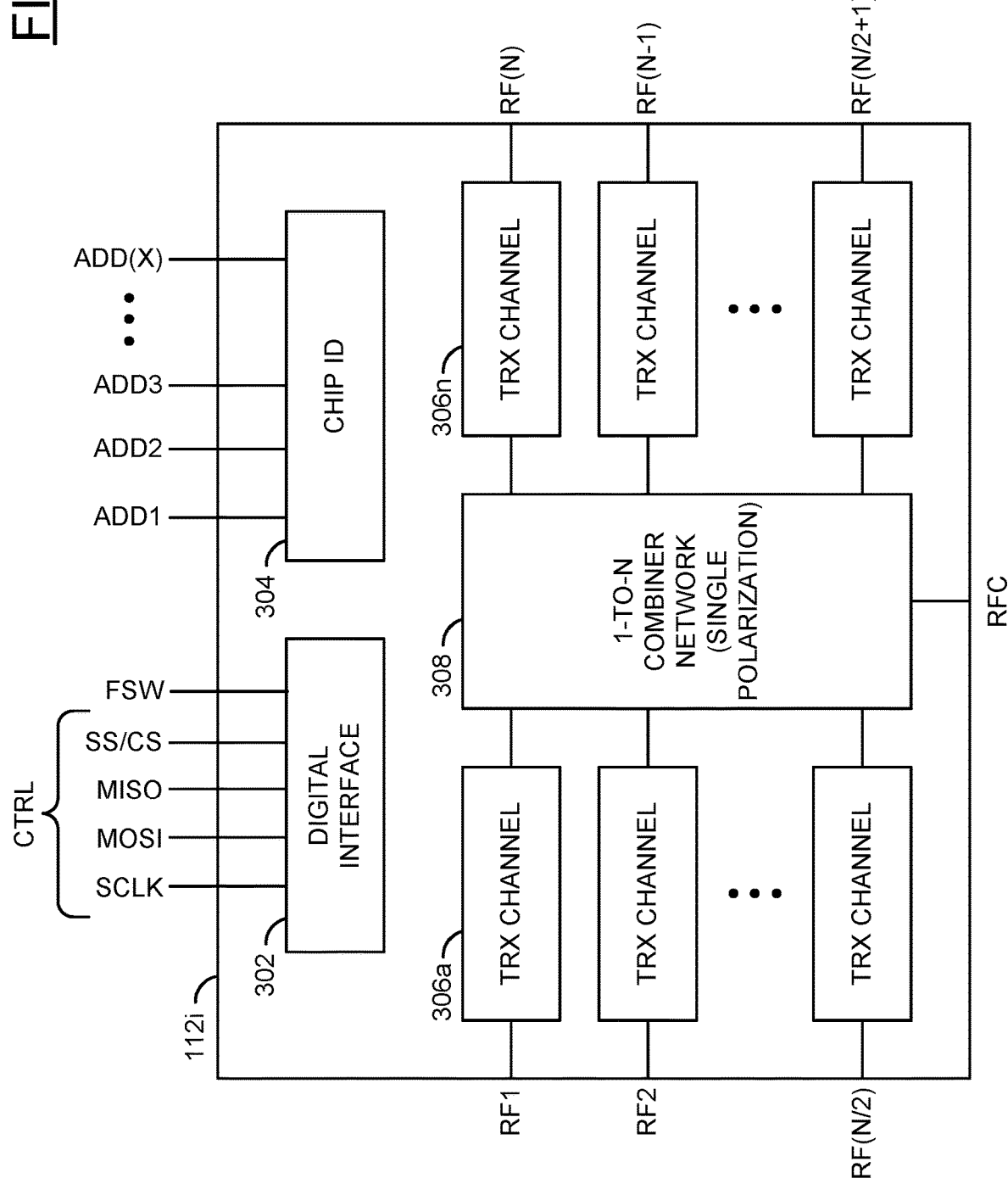
FIG. 4 is a diagram illustrating a single-polarization beam former circuit in accordance with an example embodiment of the invention.

Referring to FIG. 4, a diagram illustrating a single-polarization beam former circuit 112i is shown in accordance with an example embodiment of the invention. In an example, the single-polarization beam former circuit 112i may be representative of the single-polarization beam former circuits 112a-112m of FIG. 2. In an example, the single-polarization beam former circuit 112i may have a digital interface configured to receive the signal FSW and the signal(s) CTRL, a common RF input/output port (RFC), and a number of antenna input/output ports (RF1-RFN). In general, any number (e.g., N) of antenna input/output ports (or channels) may be implemented accordingly to meet design criteria of a particular implementation.

In various embodiments, the signal RF may be presented/received by the common RF input/output RFC, and the antenna input/output ports RF1-RFN may be coupled to respective antenna elements 110. The single-polarization beam former circuit 112i generally implements a number of transceiver channels corresponding to the number of antenna input/output ports RF1-RFN. In various embodiments, each of the transceiver channels may comprise a respective transmit channel and a respective receive channel. The transceiver channels are generally configured to switch between transmitting or receiving based upon the signal FSW.

The single-polarization beam former circuit 112i generally implements a transmit mode and a receive mode. In an example, a state of the signal FSW may determine whether the transmit mode or the receive mode is active. In the transmit mode, the single-polarization beam former circuit 112i is generally configured to receive the radio frequency signal RF at the common input/output port RFC and present radio frequency signals at the antenna input/output ports RF1-RFN. The signals presented at each of the antenna input/output ports RF1-RFN are generated by the single-polarization beam former circuit 112i in response to the radio frequency signal RF received at the common input/output port RFC and a respective number of setting values (e.g., gain, phase, etc.) for each transceiver channel corresponding to each of the antenna input/output ports RF1-RFN. In the receive mode, the single-polarization beam former circuit 112i is generally configured to combine radio frequency signals received at the antenna input/output ports RF1-RFN for presentation as the signal RF at the common input/output port RFC.

The single-polarization beam former circuit 112i may comprise a block (or circuit) 302, a block (or circuit) 304, a number of blocks (or circuits) 306a-306n, and a block (or circuit) 308. The circuit 302 may implement an interface circuit. In various embodiments, the circuit 302 may implement a digital interface. The circuit 304 may implement a hardwired address (e.g., chip ID) for the beam former circuit 112i. The circuits 306a-306n may implement transceiver (TRX) channels. The circuit 308 may implement a 1-to-N combiner/splitter network.

In an example, the signals FSW and CTRL are exchanged with the circuit 302. In an example, the circuit 302 may comprise a serial interface. The circuit 302 may be configured to be compliant with one or more serial interface standards including, but not limited to, serial peripheral interface (SPI), inter-integrated circuit ($I^2C$), daisy chain, etc. In an example, the circuit 302 may be configured to allow programming and control of the single-polarization beam former circuit 112i using a serial communication link (or bus). In an example, the circuit 302 may be configured to program and control the circuits 306a-306n in response to the signals CTRL and FSW. In an example, the circuit 302 may control whether the circuits 306a-306n operate in a transmit mode or a receive mode in response to the signal FSW.

In an example, the circuit 302 may implement a 4-wire embedded SPI core. In an example, the circuit 302 may have a first pin that may receive a first signal (e.g., MOSI), a second pin that may present a second signal (e.g., MISO), a clock input pin that may receive a clock signal (e.g., SCLK), and a chip enable (or chip select) pin that may receive a signal (e.g., SS/CS). In an example, the signals MOSI, MISO, SCLK, and SS/CS may be components of the signal(s) CTRL. In an example, the circuit 302 may include a transmit/receive function switching pin that may receive the signal FSW. In an example, the signals MOSI, MISO, SCLK, and SS/CS may be configured to implement a 4-wire SPI protocol interface as summarized in the following TABLE 1:

TABLE 1

| SIGNAL | FUNCTION |
| --- | --- |
| MOSI | Master out Slave in |
| MISO | Master in Slave out |
| SCLK | Serial clock |
| SS/CS | Slave Select/Chip Select |

In an example, the circuit 304 may set a physical address of the beam former circuit 112i based upon hardware coded address bits (or pins). In various embodiments, a hardwired address may be implemented having a number (e.g., X) of input bits (e.g., ADD1, ADD2, . . . , ADD(X)). In an example, the address may be implemented having six bits (or pins). In some embodiments, the hardware address may be set to predetermined logic levels (e.g., 0 or 1) by tying a number of address pins to predetermined supply voltages (e.g., GND, VSS, or VDD). In some embodiments, the hardware address bits may be hard coded within the chip implementing the beam former 112i. In some embodiments, the hardware address bits may be programmable within the chip implementing the beam former 112i during manufacturing. In an example, the hardware address bits may be programmed using fuses, anti-fuses, or other conventional techniques.

Figure 5:
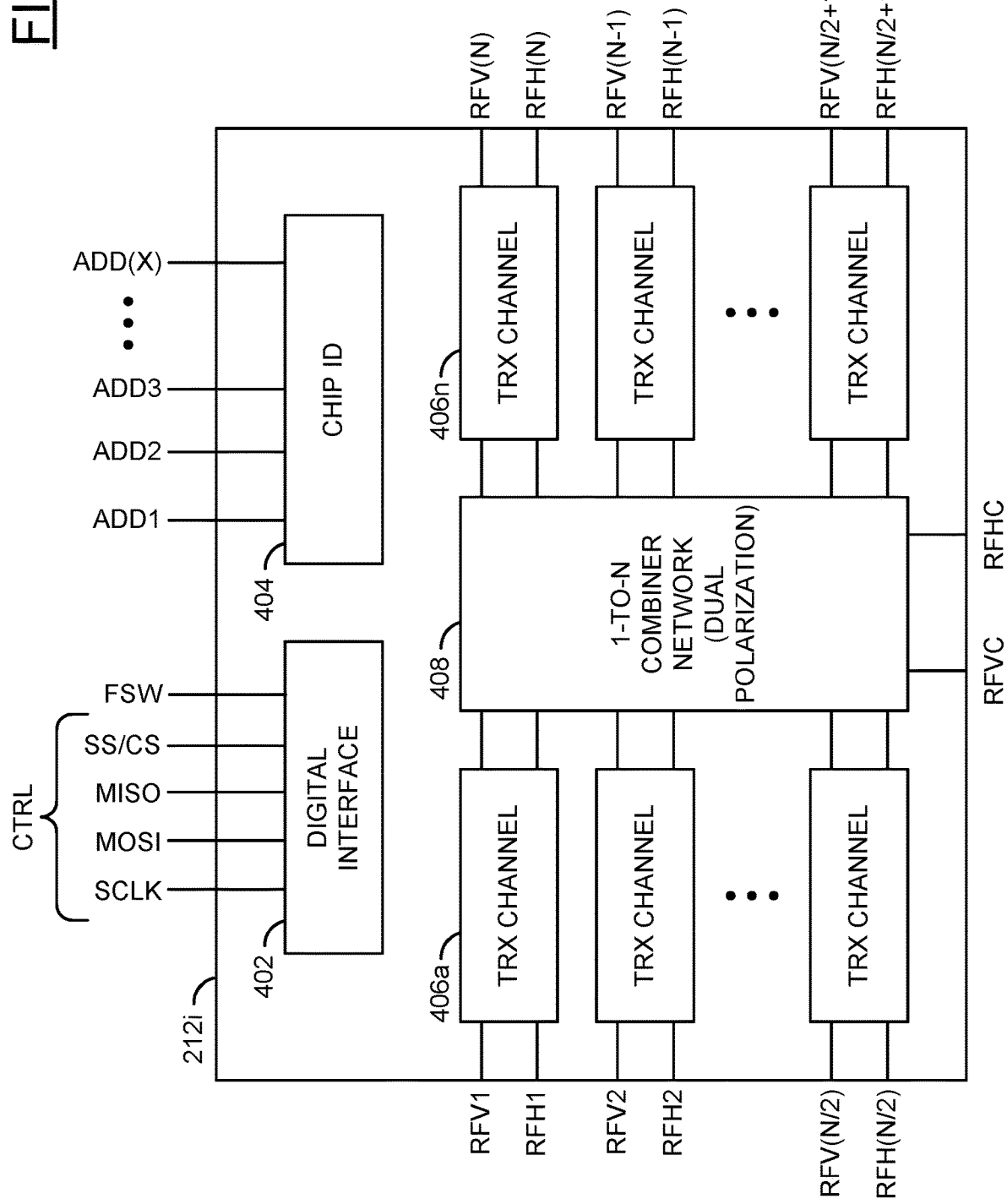
FIG. 5 is a diagram illustrating a dual-polarization beam former circuit in accordance with an example embodiment of the invention.

Referring to FIG. 5, a diagram illustrating an example implementation of a dual-polarization beam former circuit 212i is shown in accordance with an example embodiment of the invention. In an example, the dual-polarization beam former circuit 212i may be representative of the dual-polarization beam former circuits 212a-212m of FIG. 3. In an example, the dual-polarization beam former circuit 212i may have a digital interface configured to receive the signal FSW and the signal(s) CTRL, a first common RF input/output port (RFVC), a second common RF input/output port (RFHC), a number of vertical antenna input/output ports (RFV1-RFV(N)), and a number of horizontal antenna input/output port (RFH1-RFH(N)). In general, any number (e.g., N) of vertical and horizontal antenna input/output ports (or channels) may be implemented accordingly to meet design criteria of a particular implementation.

In various embodiments, the signal RFV may be presented/received by the common RF input/output RFVC, the signal RFH may be presented/received by the common RF input/output RFHC, the vertical antenna input/output ports RFV1-RFV(N) may be coupled to corresponding vertical input/outputs of the respective antenna elements 210, and the horizontal antenna input/output ports RFH1-RFH(N) may be coupled to corresponding horizontal input/outputs of the respective antenna elements 210. The dual-polarization beam former circuit 212i generally implements a number (e.g., N) of transceiver channels corresponding to the number of pairs of vertical and horizontal antenna input/output ports (RFV1, RFH1), (RFV2, RFH2), . . . (RFV(N), RFH(N)). In various embodiments, each of the transceiver channels may comprise a respective transmit channel and a respective receive channel. The transceiver channels are generally configured to switch between transmitting or receiving based upon the signal FSW.

The dual-polarization beam former circuit 212i generally implements a transmit mode and a receive mode. In an example, a state of the signal FSW may determine whether the transmit mode or the receive mode is active. In the transmit mode, the dual-polarization beam former circuit 212i is generally configured to receive radio frequency signals at the common input/output ports RFVC and RFHC, and present radio frequency signals at the antenna input/output ports RFV1-RFV(N) and RFH1-RFH(N). The signals presented at each of the antenna input/output ports RFV1-RFV(N) and RFH1-RFH(N) are generated by the dual-polarization beam former circuit 212i in response to the radio frequency signals received at the common input/output ports RFVC and RFHC and a respective number of setting values (e.g., gain, phase, etc.) corresponding to each of the antenna input/output ports RFV1-RFV(N) and RFH1-RFH(N).

In an example, the dual-polarization beam former circuit 212i may comprise a block (or circuit) 402, a block (or circuit) 404, a number of blocks (circuits) 406a-406n, and a block (or circuit) 408. The circuit 402 may implement an interface circuit. In various embodiments, the circuit 402 may implement a digital interface. The circuit 404 may implement a hardwired address (e.g., chip ID) for the beam former circuit 212i. The circuits 406a-406n may implement transceiver (TRX) channels. The circuit 408 may implement a 1-N dual-channel combiner/splitter network.

In an example, the signals FSW and CTRL are exchanged with the circuit 402. In an example, the circuit 402 may comprise a serial interface. The circuit 402 may be configured to be compliant with one or more serial interface standards including, but not limited to, serial peripheral interface (SPI), inter-integrated circuit ($I^2C$), daisy chain, etc. In an example, the circuit 402 may be configured to allow programming and control of the dual-polarization beam former circuit 212i using a serial communication link (or bus). In an example, the circuit 402 may be configured to program and control the circuits 406a-406n in response to the signals CTRL and FSW. In an example, the circuit 402 may control whether the circuits 406a-406n operate in a transmit mode or a receive mode in response to the signal FSW.

In an example, the circuit 402 may implement a 4-wire embedded SPI core. In an example, the circuit 402 may have a first pin that may receive a first signal (e.g., MOSI), a second pin that may present a second signal (e.g., MISO), a clock input pin that may receive a clock signal (e.g., SCLK), and a chip enable (or chip select) pin that may receive a signal (e.g., SS/CS). In an example, the signals MOSI, MISO, SCLK, and SS/CS may be components of the signal(s) CTRL. In an example, the circuit 402 may include a transmit/receive function switching pin that may receive the signal FSW. In an example, the signals MOSI, MISO, SCLK, and SS/CS may be configured to implement the 4-wire SPI protocol interface as summarized in the TABLE 1 above.

In an example, the circuit 404 may set a physical address of the dual-polarization beam former circuit 212i based upon hardware coded address bits (or pins). In various embodiments, a hard-wired address may be implemented having a number (e.g., X) of input bits (e.g., ADD1, ADD2, . . . , ADD(X)). In an example, the address may be implemented having six bits (or pins). In some embodiments, the hard-wired address may be set to predetermined logic levels (e.g., 0 or 1) by tying a number of address pins to predetermined supply voltages (e.g., GND, VSS, or VDD). In some embodiments, the hard-wired address bits may be hard coded within the chip implementing the beam former 212i during manufacturing. In some embodiments, the hard-wired address bits may be programmed within the chip implementing the beam former 212i. In an example, the hard-wired bits may be programmed using fuses, anti-fuses, or other conventional techniques.

Figure 6:
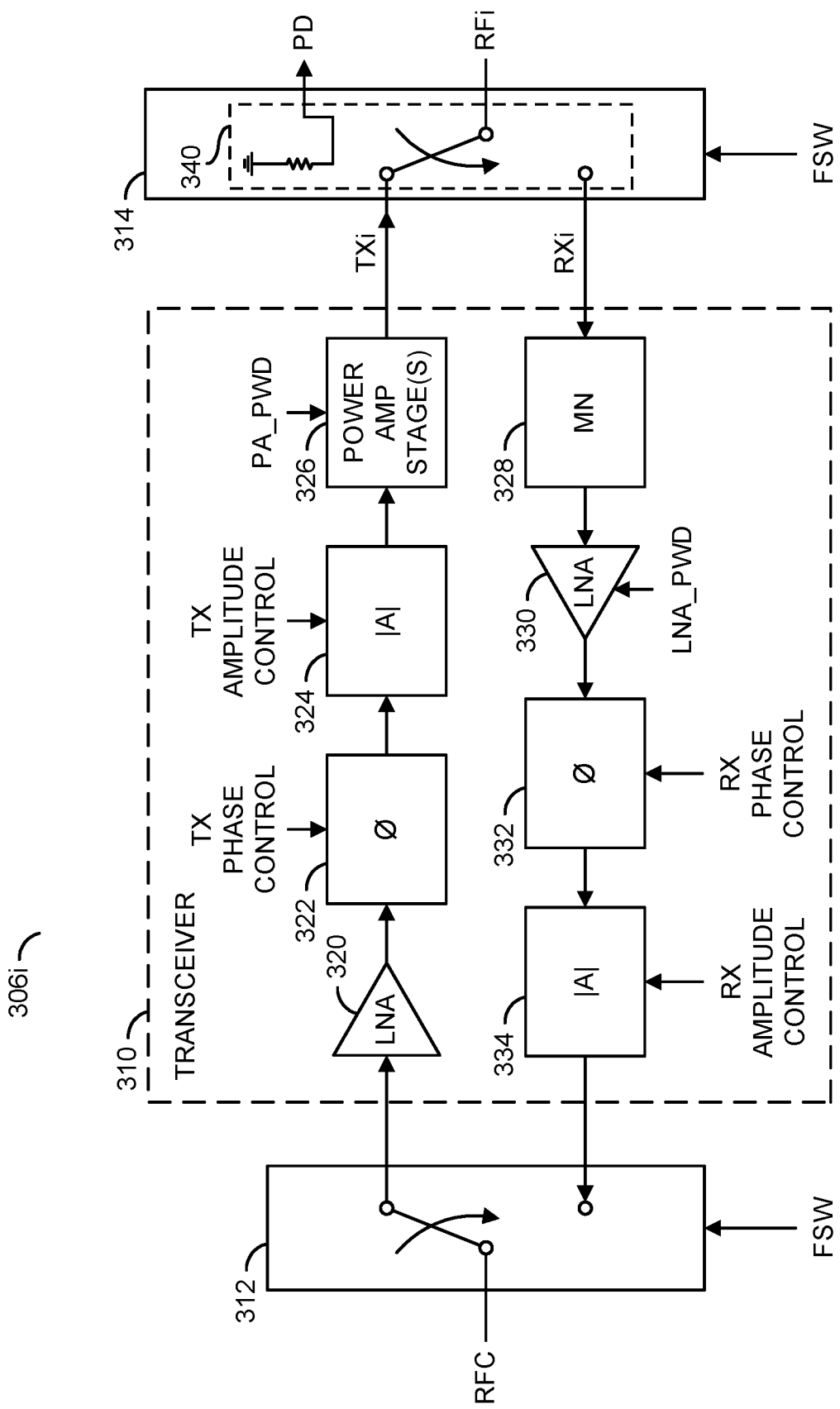
FIG. 6 is a diagram illustrating a transceiver channel in accordance with an example embodiment of the invention.

Referring to FIG. 6, a diagram illustrating a transceiver circuit 306i is shown in accordance with an embodiment of the invention. In an example, the transceiver circuit 306i may be representative of the single-polarization beam former transceiver circuits (or channels) 306a-306d of FIG. 4. In another example, the transceiver circuit 306i may be representative of either horizontal or vertical beam former transceiver circuits (or channels) of a dual-polarization beam former circuit (or chip) of FIG. 5. In an example embodiment, the circuit 306i may comprise a block (or circuit) 310, a block (or circuit) 312, and a block (or circuit) 314. In an example embodiment, the circuit 310 may implement a transceiver circuit. Each block 312 and 314 may implement a T/R switch. A transceiver circuit is generally capable of both transmitting and receiving signals of a communication channel. In various embodiments, the circuit 310 may be capable of transmitting and receiving radio frequency (RF), microwave, and/or millimeter-wave signals.

In various embodiments, the circuit 310 may be representative of transceiver circuits utilized in radio frequency applications including, but not limited to cellular base stations (e.g., 2G, 3G, 4G, 5G, etc.), wireless communication systems, wireless local area networks (WLANs), wireless backhaul channels, broadband repeaters, community antenna television (CATV) networks, macro cells, micro cells, pico cells, femto cells, mobile devices (MDs), and/or portable handheld devices (UEs). In some embodiments, the circuit 310 may be representative of a radar application including, but not limited to target detection, ranging, and/or through-wall imaging. In an example, the transceiver circuit 310 generally comprises both a transmitter chain and a receiver chain. Both the transmitter chain and the receiver chain may comprise radio frequency (RF) amplifiers.

In an example, the transmitter chain may include an input amplifier 320, a variable (programmable) phase shifter 322, a variable (programmable) attenuator 324, and one or more output amplifier stages 326. In an example, the input amplifier 320 may be implemented as a low noise amplifier (LNA). The output amplifier stages 326 may include drivers, pre-amplifiers, and/or power amplifiers. In an example, the receiver chain may include a limiter (or protection) and filter (MN) circuit 328, a low noise amplifier (LNA) 330, a variable (programmable) phase shifter 332, and a variable (programmable) attenuator 334. In an example, an input of the transmitter chain and an output of the receiver chain may be coupled to a transmission line or an RF transceiver system by the T/R switch 312. In an example, an output of the transmitter chain and an input of the receiver chain may be coupled to a transmission line or an antenna by the T/R switch 314.

In various embodiments, the variable phase shifter 322, the variable attenuator 324, the variable phase shifter 332, and the variable attenuator 334 may be implemented using conventional techniques. In general, the amplifier circuits of the transceiver circuit 310 may provide improved linearity for wideband modulated signals by utilizing a bias network (or circuit) in accordance with an embodiment of the invention.

The T/R switch 314 may include a power detector circuit 340. The circuit 340 is generally operational to detect the power level of the RF signal flowing through the T/R switch 314. A power detection signal (e.g., PD) may be generated by the circuit 340 and transferred to the controller 86 (FIG. 1). The signal PD may convey the detected power level of the RF signal. In various embodiments, the detected power may be an output power level of the transmit signal TXi. In other embodiments, the detected power may be an input power level of the receive signal RXi.

Figure 7:
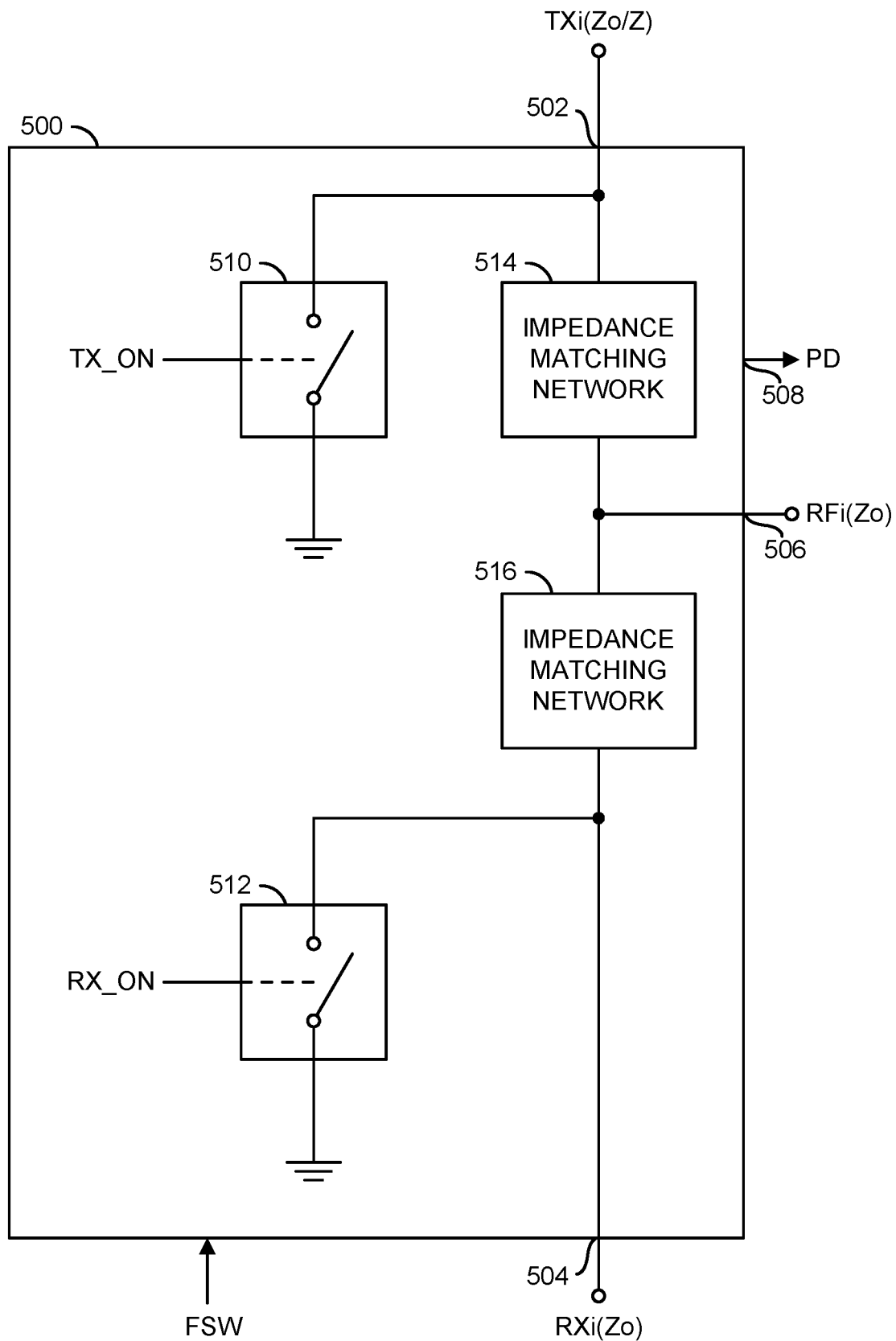
FIG. 7 is a diagram illustrating a transmit-receive switch in accordance with an example embodiment of the invention.

Referring to FIG. 7, a block illustrating a T/R switch circuit 500 is shown in accordance with an example embodiment of the invention. The circuit 500 may be representative of each instantiation of the T/R switch 314. In an example, the circuit 500 may implement a single-pole double-throw (SPDT) T/R switch. However, embodiments with higher numbers of poles and/or throws may be implemented accordingly to meet design criteria of particular applications. In various embodiments, the circuit 500 may support a wide variety of radio frequency (RF), microwave, and/or millimeter-wave applications including, but not limited to cellular base stations (e.g., 2G, 3G, 4G, 5G, etc.), wireless communication systems, wireless local area networks (WLANs), wireless backhaul channels, broadband repeaters, community antenna television (CATV) networks, macro cells, micro cells, pico cells, femto cells, mobile devices (MDs), and portable handheld devices (UEs). In various embodiments, the circuit 500 may be configured to cover frequencies ranging from 100 MHZ to over 100 GHz. In an example, the circuit 500 may be configured (e.g., optimized) for use at particular frequencies (e.g., a 39 GHz 5G application, etc.).

In various embodiments, the circuit 500 may comprise a block (or circuit) 510, a block (or circuit) 512, a block (or circuit) 514, and a block (or circuit) 516. The circuit 510 may implement a first (input) shunt switch. The circuit 512 may implement a second (output) shunt switch. The circuit 514 may implement a first impedance matching network. The circuit 516 may implement a second impedance matching network. In various embodiments, the impedance matching networks 514 and 516 provide asymmetrical impedances. In various embodiments, the impedance matching network 514 generally provides a lower impedance than the impedance matching network 516. In an example, the impedance matching network 514 provides an impedance that is a fraction (e.g., ½, ⅓, ¼, etc.) of the impedance of the impedance matching network 516.

A TX port 502 of the circuit 500 may be coupled to a first terminal of the circuit 510 and a first terminal of the circuit 514. A second terminal of the circuit 510 may be coupled to a circuit ground potential (GND). The circuit 510 may have a control input that may receive a first control signal (e.g., TX_ON). A RX port 504 of the circuit 500 may be coupled to a first terminal of the circuit 512 and a first terminal of the circuit 516. A second terminal of the circuit 512 may be coupled to the circuit ground potential (GND). The circuit 512 may have a control input that may receive a second control signal (e.g., RX_ON). A TRX port 506 of the circuit 500 may be coupled to a second terminal of the circuit 514 and a second terminal of the circuit 516. A port 508 may be coupled to the circuit 514 and/or the circuit 516. The port 508 may present the signal PD.

In an example, the circuits 514 and 516 may be configured such that (i) there is a 90 degree delay from either the RX port 504 or the TX port 502 to the TRX port 506, (ii) the RX port 504 and the TRX port 506 have a similar impedance (e.g., $Z_0$), and (iii) the TX port 502 has a lower impedance (e.g., $Z_0/2$, etc.). In an example, the signals TX_ON and RX_ON may be generated in response to the signal FSW at a control input of the circuit 500. In an example, the signals TX_ON and RX_ON may be implemented as summarized in the following TABLE 2:

TABLE 2

| FSW | TX_ON | RX_ON |
|---|---|---|
| LOW | OFF (unasserted) | ON (asserted) |
| HIGH | ON (asserted) | OFF (unasserted) |

When signal FSW is LOW, the switch circuit 510 may be in a conducting state (and the switch circuit 512 may be in a non-conducting state) that shorts the TX port 502 to the circuit ground potential GND. Because there is a 90 degrees delay to the TRX port 506, the TX port 502 appears to be open, and the signal RFi flows from the TRX port 506 to the RX port 504 as the signal RXi. When signal FSW is HIGH, the switch circuit 512 may be in a conducting state (and the switch circuit 514 may be in a non-conducting state) that shorts the RX port 504 to the circuit ground potential GND. Because there is a 90 degrees delay to the TRX port 506, the RX port 504 appears to be open, and the signal TXi flows from the TX port 502 to the TRX port 506 as the signal RFi. Thus, the circuit 500 may be referred to as a reflective asymmetrical, single-pole double-throw T/R switch. Because the impedance of the TX port 502 is lower, the asymmetrical structure generally reduces the voltage swings at the TX port 502 (e.g., $P=V^2/R$). The power detection circuit 340 may be integrated into the circuit 514 and/or the circuit 516.

Figure 8:
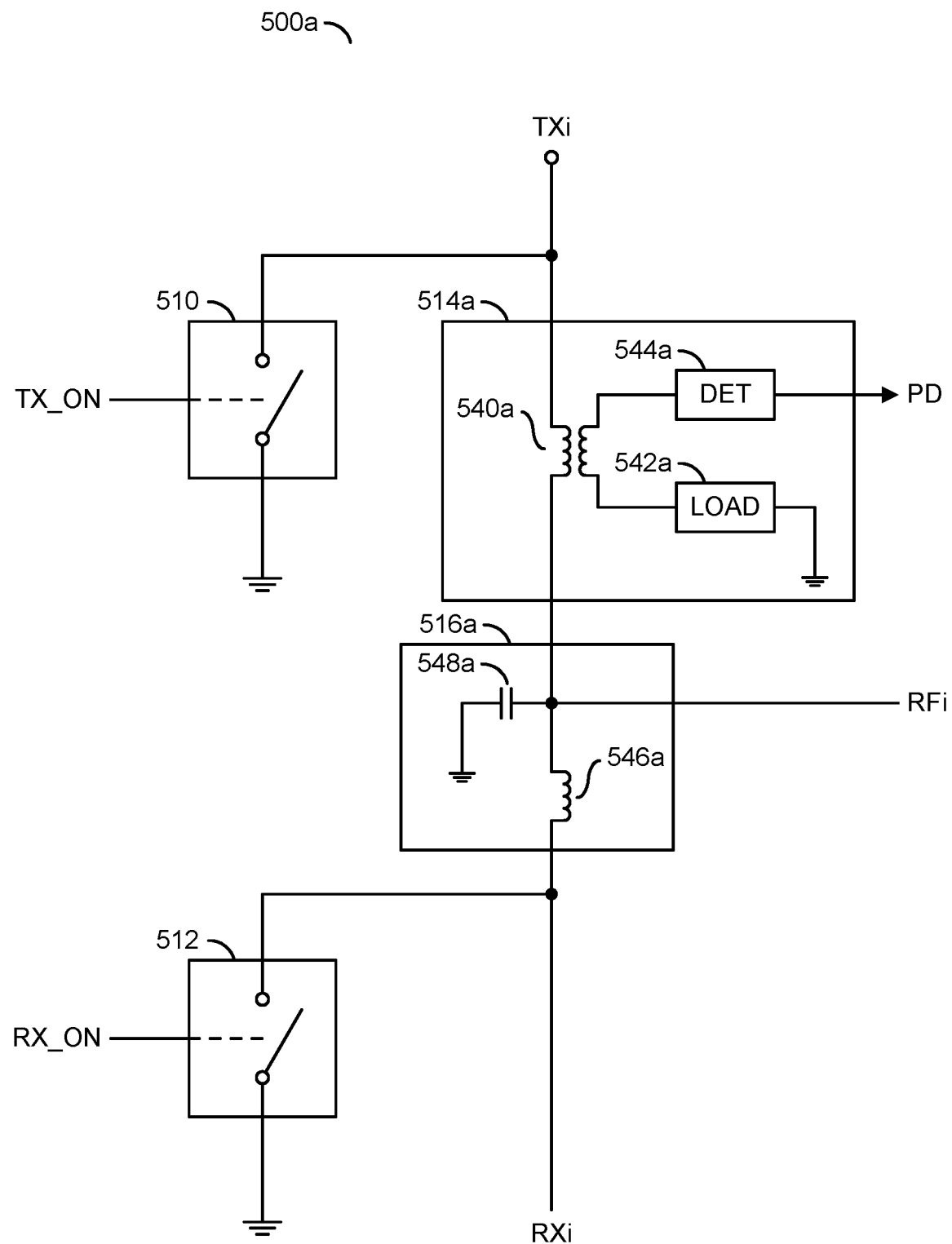
FIG. 8 is a diagram illustrating a transmit-receive switch with transformer-based transmit power detection in accordance with an example embodiment of the invention.

Referring to FIG. 8, a diagram illustrating a T/R switch 500a with transformer-based transmit power detection is shown in accordance with an example embodiment of the invention. The T/R switch 500a generally comprises the switch 510, the switch 512, a block (or circuit) 514a and a block (or circuit) 516a. The T/R switch 500a may be a variation on the T/R switch 500 with the power detection integrated into the circuit 514a. The circuit 514a may be a variation of the impedance matching network 514 with the added power detection capability. The circuit 516a may be a variation of the impedance matching network 516.

The impedance matching network 514a generally comprises a block (or circuit) 540a, a block (or circuit) 542a and a block (or circuit) 544a. The circuit 540a may implement a transformer. The transformer 540a may provide both the impedance matching network and sample a portion of the power in the signal TXi. The circuit 542a may implement a load connected to a secondary winding of the transformer 540a. In an example, a coupling ratio of the transformer 540a may be adjusted according to a desired sampling ratio. The circuit 544a may implement a power detection circuit connected to the secondary winding of the transformer 540a. The circuit 544a is generally operational to detect the power level of the RF signal received from the transformer 540a and present the detected power level in the signal PD.

The impedance matching network 516a generally comprises an inductor 546a and a shunt capacitor 548a. The inductor 546a and the shunt capacitor 548a may be configured to provide the asymmetrical impedance to the primary winding of the transformer 540a.

Figure 9:
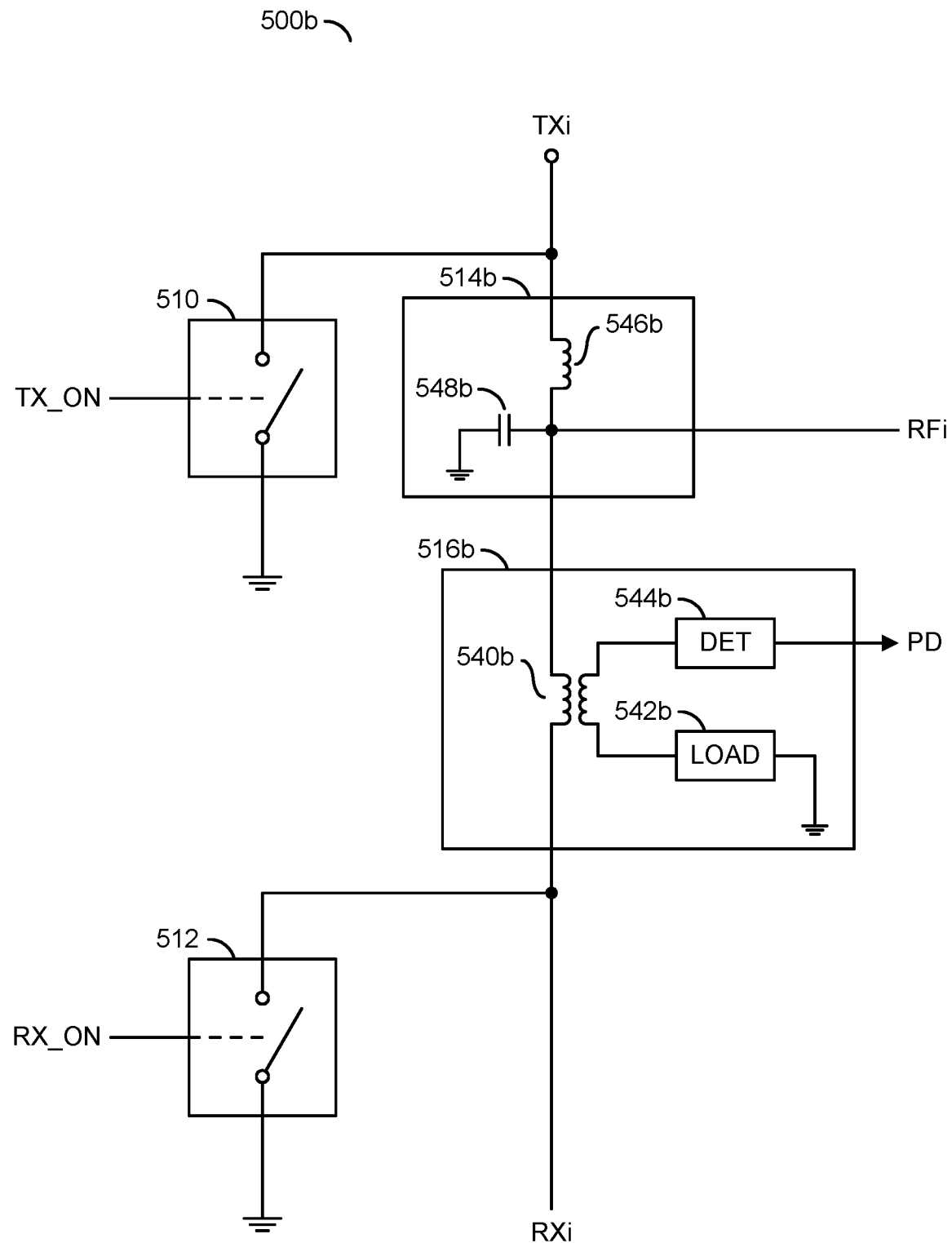
FIG. 9 is a diagram illustrating a transmit-receive switch with transformer-based receive power detection in accordance with an example embodiment of the invention.

Referring to FIG. 9, a diagram illustrating a T/R switch 500b with transformer-based receive power detection is shown in accordance with an example embodiment of the invention. The T/R switch 500b generally comprises the switch 510, the switch 512, a block (or circuit) 514b and a block (or circuit) 516b. The T/R switch 500b may be a variation on the T/R switch 500 with the power detection integrated into the circuit 516b. The circuit 514b may be a variation of the impedance matching network 514. The circuit 516b may be a variation of the impedance matching network 516 with the added power detection capability.

The impedance matching network 516b generally comprises a block (or circuit) 540b, a block (or circuit) 542b and a block (or circuit) 544b. The circuit 540b may implement a transformer. The transformer 540b may provide both the impedance matching network and sample a portion of the power in the signal RXi. The circuit 542b may implement a load connected to a secondary winding of the transformer 540b. The circuit 544b may implement a power detection circuit connected to the secondary winding of the transformer 540b. The circuit 544b is generally operational to detect the power level of the RF signal received from the transformer 540b and present the detected power level in the signal PD.

The impedance matching network 514b generally comprises an inductor 546b and a shunt capacitor 548b. The inductor 546b and the capacitor 548b may be configured to provide the asymmetrical impedance to a primary winding of the transformer 540b.

Figure 10:
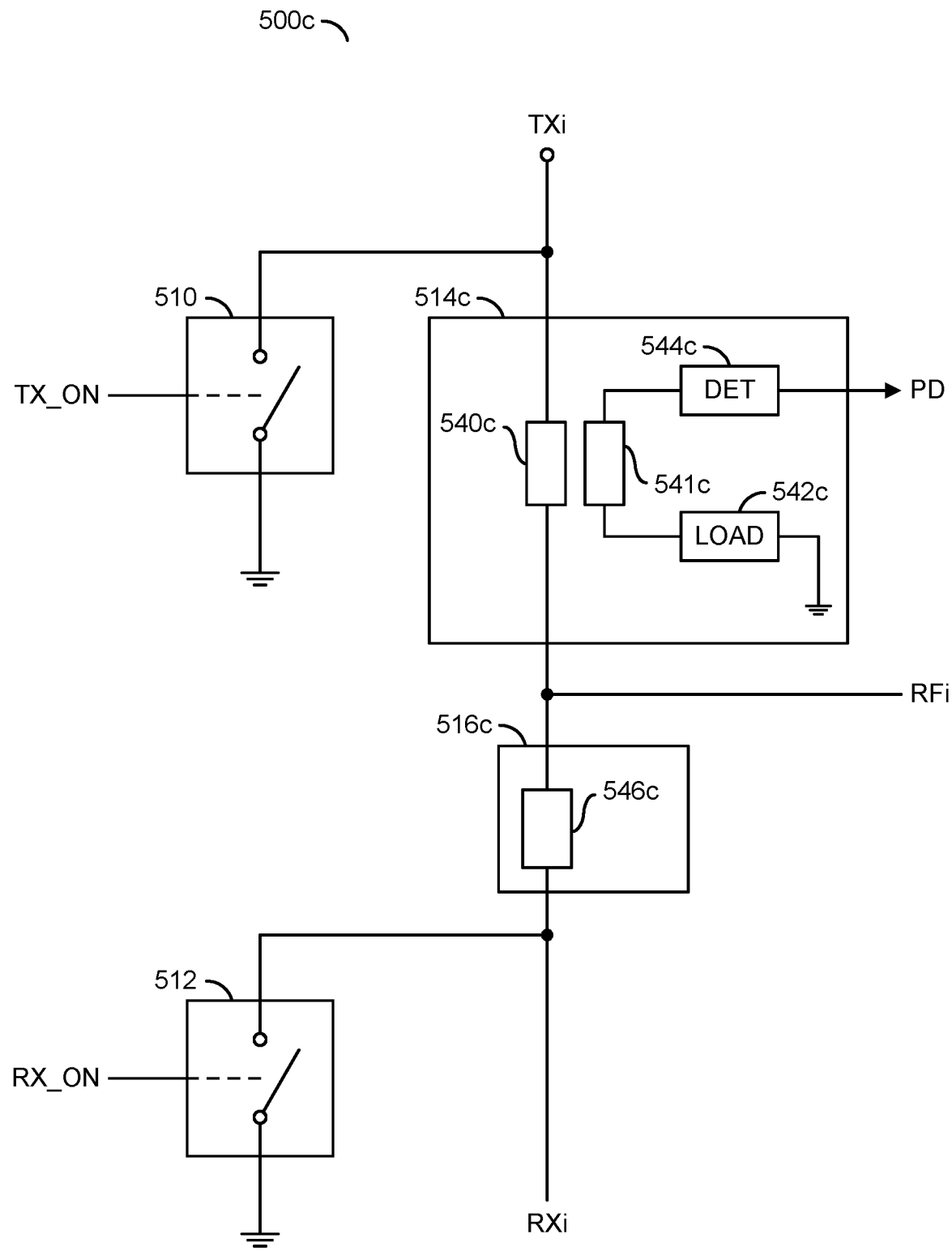
FIG. 10 is a diagram illustrating a transmit-receive switch with microstrip line-based transmit power detection in accordance with an example embodiment of the invention.

Referring to FIG. 10, a diagram illustrating a T/R switch 500c with microstrip line-based transmit power detection is shown in accordance with an example embodiment of the invention. The T/R switch 500c generally comprises the switch 510, the switch 512, a block (or circuit) 514c and a block (or circuit) 516c. The T/R switch 500c may be a variation on the T/R switch 500 with the power detection integrated into the circuit 514c. The circuit 514c may be a variation of the impedance matching network 514 with the added power detection capability. The circuit 516c may be a variation of the impedance matching network 516.

The impedance matching network 514c generally comprises a block (or circuit) 540c, a block (or circuit) 541c, a block (or circuit) 542c and a block (or circuit) 544c. The circuits 540c and 541c may implement a pair of coupled microstrips (or transmission lines). The coupled microstrips 540c and 541c may provide both the impedance matching network and sample a portion of the power in the signal TXi. The circuit 542c may implement a load connected to the sampling microstrip 541c. The circuit 544c may implement a power detection circuit connected to the sampling microstrip 541c. The circuit 544c is generally operational to detect the power level of the RF signal received from the sampling microstrip 541c and present the detected power level in the signal PD.

The impedance matching network 516c generally comprises a microstrip 546c (or transmission line). The microstrip 546c may be configured to provide the asymmetrical impedance to the primary microstrip 540c.

Figure 11:
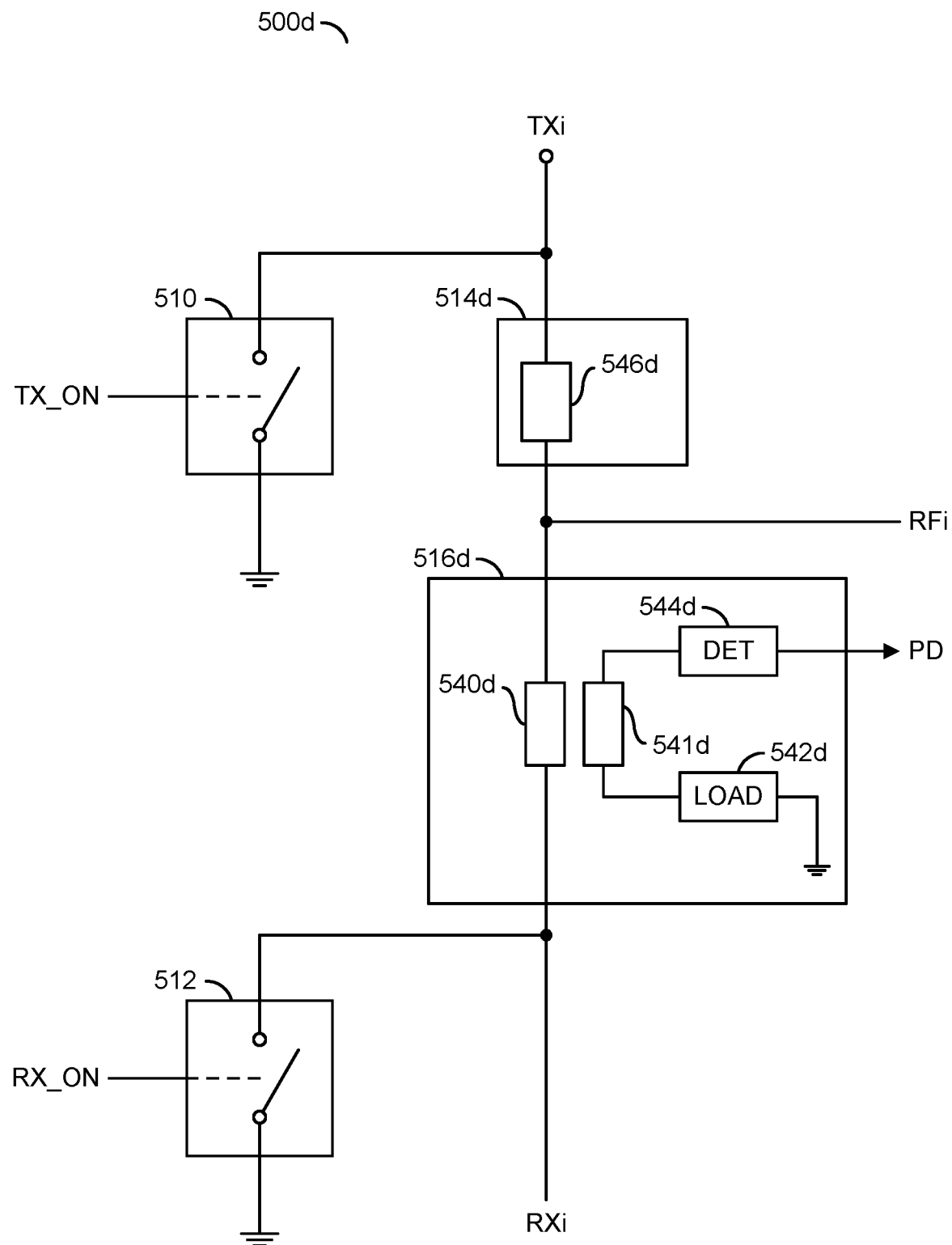
FIG. 11 is a diagram illustrating a transmit-receive switch with microstrip line-based receive power detection in accordance with an example embodiment of the invention.

Referring to FIG. 11, a diagram illustrating a T/R switch 500d with microstrip line-based receive power detection is shown in accordance with an example embodiment of the invention. The T/R switch 500d generally comprises the switch 510, the switch 512, a block (or circuit) 514d and a block (or circuit) 516d. The T/R switch 500d may be a variation on the T/R switch 500 with the power detection integrated into the circuit 516d. The circuit 516d may be a variation of the impedance matching network 516 with the added power detection capability. The circuit 514d may be a variation of the impedance matching network 514.

The impedance matching network 516d generally comprises a block (or circuit) 540d, a block (or circuit) 541d, a block (or circuit) 542d and a block (or circuit) 544d. The circuits 540d and 541d may implement a pair of coupled microstrips (or transmission lines). The coupled microstrips 540d and 541d may provide both the impedance matching network and sample a portion of the power in the signal RXi.

The circuit 542d may implement a load connected to the sampling microstrip 541d. The circuit 544d may implement a power detection circuit connected to the sampling microstrip 541d. The circuit 544d is generally operational to detect the power level of the RF signal received from the sampling microstrip 541d and present the detected power level in the signal PD.

The impedance matching network 514d generally comprises a microstrip 546d (or transmission line). The microstrip 546d may be configured to provide the asymmetrical impedance to the primary microstrip 540d.

Figure 12:
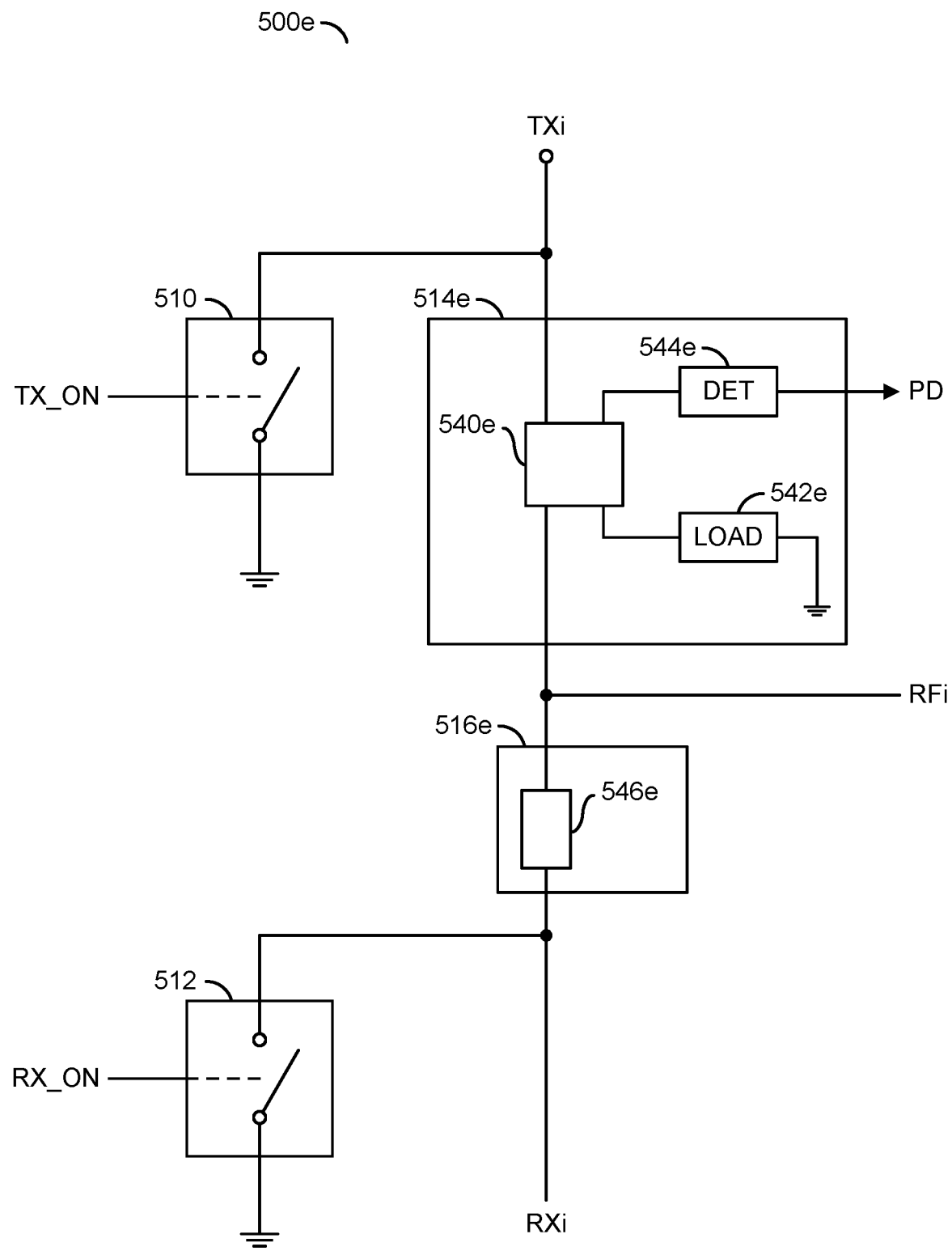
FIG. 12 is a diagram illustrating a transmit-receive switch with coupled line coupler-based transmit power detection in accordance with an example embodiment of the invention.

Referring to FIG. 12, a diagram illustrating a T/R switch 500e with coupled line coupler-based transmit power detection is shown in accordance with an example embodiment of the invention. The T/R switch 500e generally comprises the switch 510, the switch 512, a block (or circuit) 514e and a block (or circuit) 516e. The T/R switch 500e may be a variation on the T/R switch 500 with the power detection integrated into the circuit 514e. The circuit 514e may be a variation of the impedance matching network 514 with the added power detection capability. The circuit 516e may be a variation of the impedance matching network 516.

The impedance matching network 514e generally comprises a block (or circuit) 540e, a block (or circuit) 542e and a block (or circuit) 544e. The circuit 540e may implement a coupled line coupler circuit. The circuit 540e may provide both the impedance matching network and sample a portion of the power in the signal TXi. The circuit 542e may implement a load connected to a coupled side of the circuit 540e. The circuit 544e may implement a power detection circuit connected to the coupled side of the circuit 540e. The circuit 544e is generally operational to detect the power level of the RF signal received from the circuit 540e and present the detected power level in the signal PD.

The impedance matching network 516e generally comprises a microstrip 546e (or transmission line). The microstrip 546e may be configured to provide the asymmetrical impedance to a main side of the circuit 540e.

Figure 13:
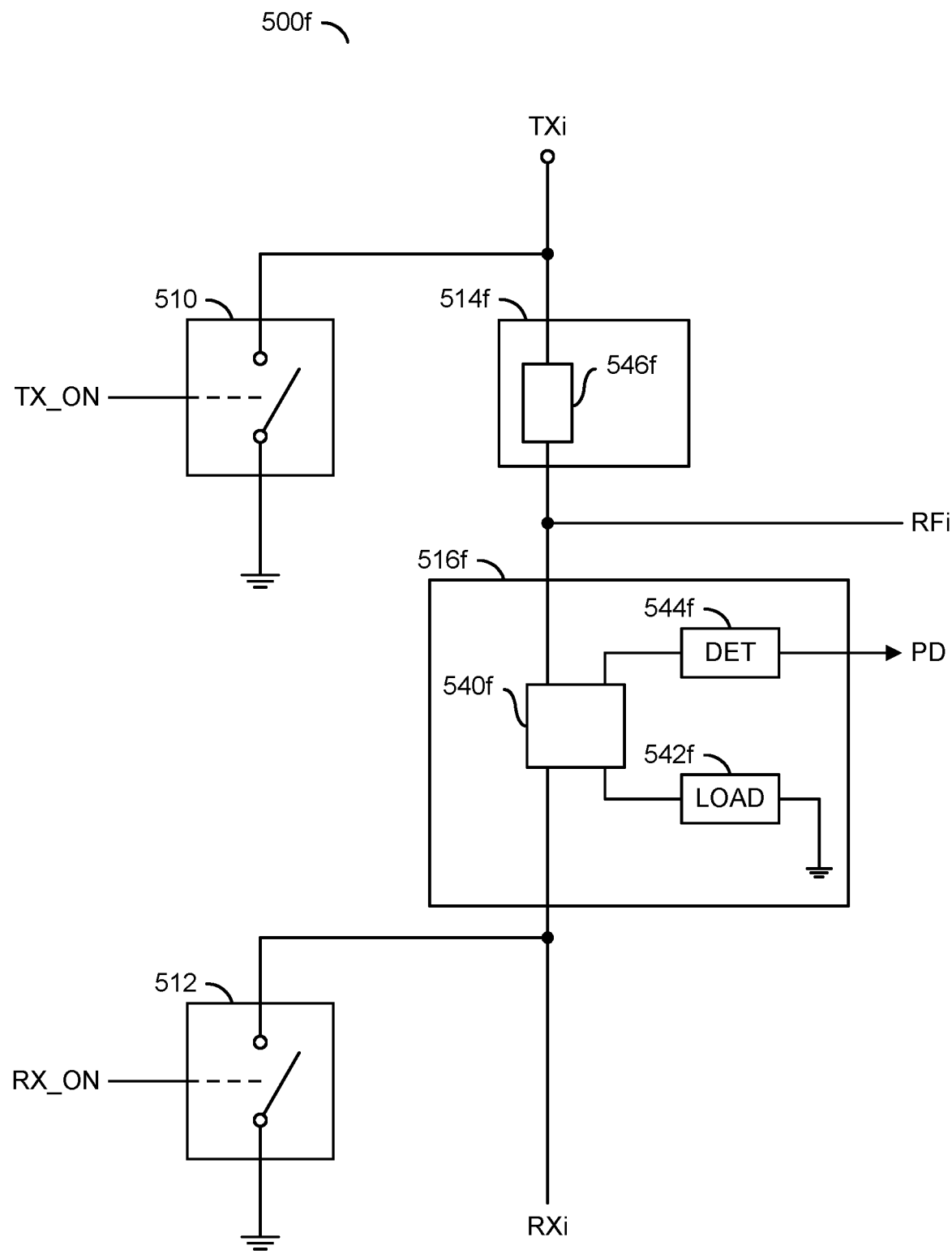
FIG. 13 is a diagram illustrating a transmit-receive switch with coupled line coupler-based receive power detection in accordance with an example embodiment of the invention.

Referring to FIG. 13, a diagram illustrating a T/R switch 500f with coupled line coupler-based receive power detection is shown in accordance with an example embodiment of the invention. The T/R switch 500f generally comprises the switch 510, the switch 512, a block (or circuit) 514f and a block (or circuit) 516f. The T/R switch 500f may be a variation on the T/R switch 500 with the power detection integrated into the circuit 516f. The circuit 516f may be a variation of the impedance matching network 516 with the added power detection capability. The circuit 514f may be a variation of the impedance matching network 514.

The impedance matching network 516f generally comprises a block (or circuit) 540f, a block (or circuit) 542f and a block (or circuit) 544f. The circuit 540f may implement a coupled line coupler circuit. The circuit 540f may provide both the impedance matching network and sample a portion of the power in the signal RXi. The circuit 542f may implement a load connected to a coupled side of the circuit 540f. The circuit 544f may implement a power detection circuit connected to the coupled side of the circuit 540f. The circuit 544f is generally operational to detect the power level of the RF signal received from the circuit 540f and present the detected power level in the signal PD.

The impedance matching network 514f generally comprises a microstrip 546f (or transmission line). The transmission line 546f circuit may be configured to provide impedance matching for the switch 510.

Figure 14:
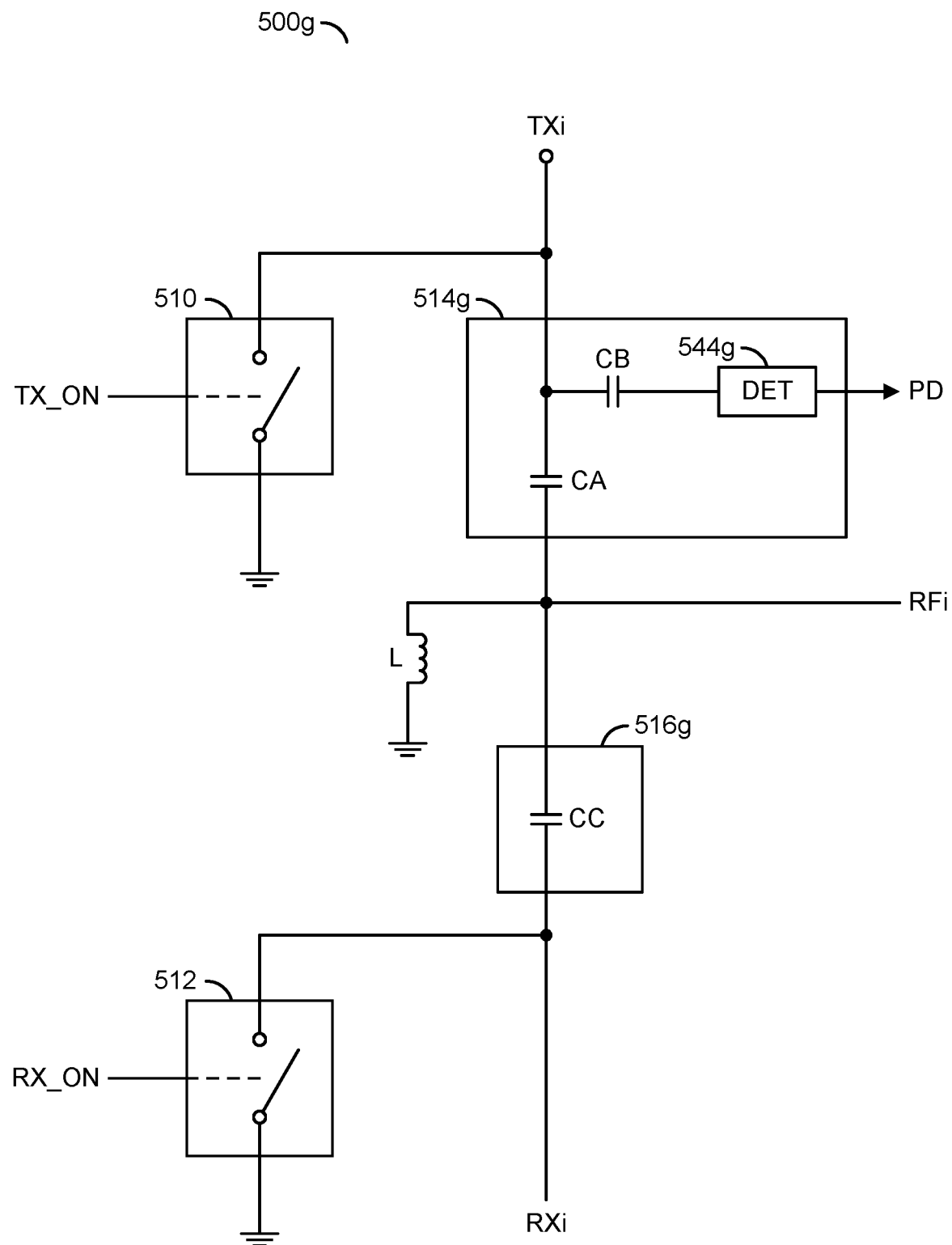
FIG. 14 is a diagram illustrating a transmit-receive switch with capacitor-based transmit power detection in accordance with an example embodiment of the invention.

Referring to FIG. 14, a diagram illustrating a T/R switch 500g with capacitor-based transmit power detection is shown in accordance with an example embodiment of the invention. The T/R switch 500g generally comprises the switch 510, the switch 512, a block (or circuit) 514g, a block (or circuit) 516g and an inductor L. The T/R switch 500g may be a variation on the T/R switch 500 with the power detection integrated into the circuit 514g. The circuit 514g may be a variation of the impedance matching network 514 with the added power detection capability. The circuit 516g and the inductor L may be a variation of the impedance matching network 516. The inductor L may be connected between the circuit ground potential GND and a node connected to both the circuit 514g and the circuit 516g.

The impedance matching network 514g generally comprises a capacitor CA, a capacitor CB and a block (or circuit) 544g. The capacitor CA may implement a feed-through capacitor. The capacitor CA may provide the impedance matching network for the signal TXi. The capacitor CB may implement a sampling capacitor. The capacitor CB may sample a portion of the power in the signal TXi. A value of the capacitor CB may be chosen according to a desired coupling. The circuit 544g may implement a power detection circuit connected to the capacitor CB. The circuit 544g is generally operational to detect the power level of the RF signal received from the capacitor CB and present the detected power level in the signal PD.

The impedance matching network 516g generally comprises a capacitor CC. The capacitor CC may be configured to provide the asymmetrical impedance to the capacitor CA.

Figure 15:
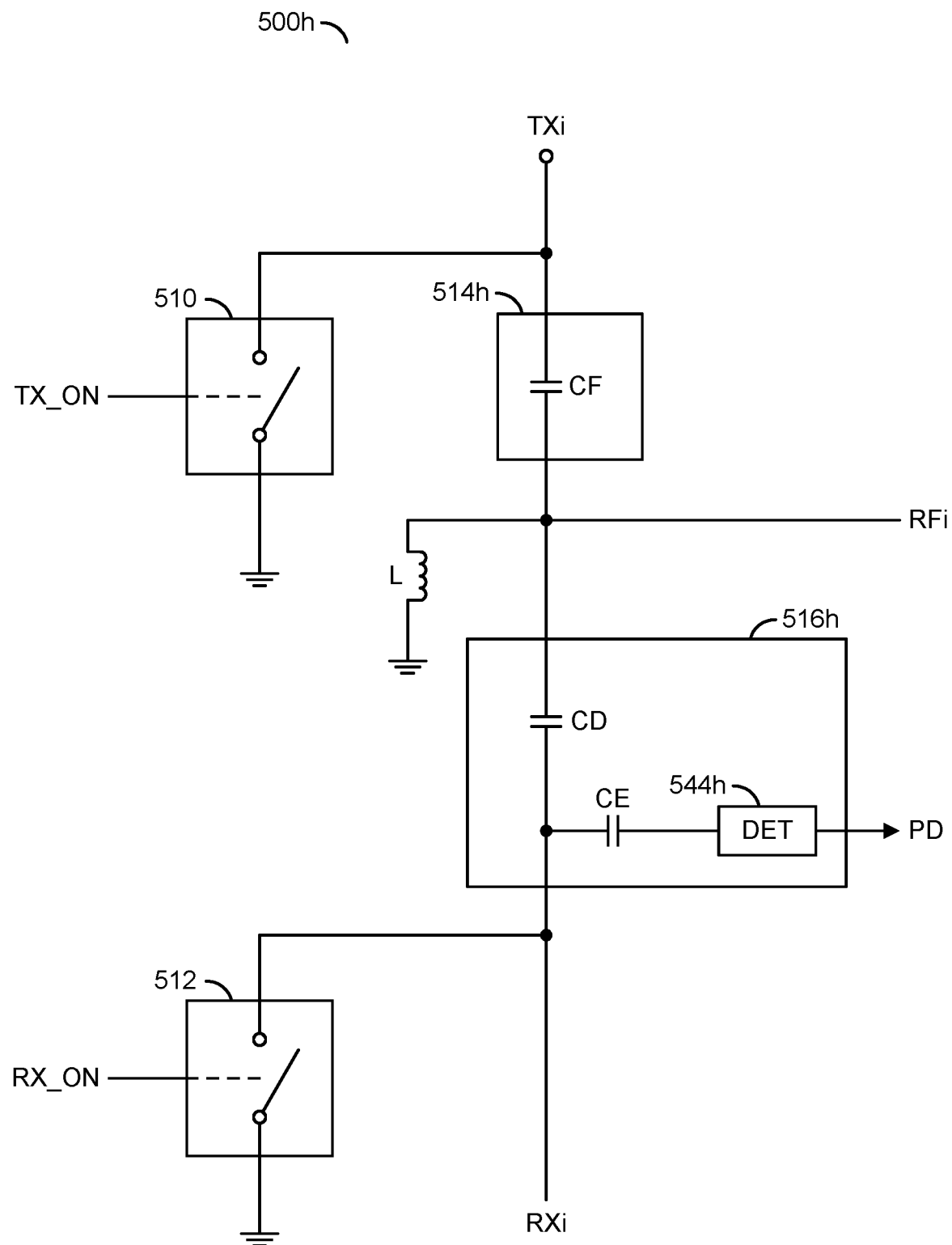
FIG. 15 is a diagram illustrating a transmit-receive switch with capacitor-based receive power detection in accordance with an example embodiment of the invention.

Referring to FIG. 15, a diagram illustrating a T/R switch 500h with capacitor-based receive power detection is shown in accordance with an example embodiment of the invention. The T/R switch 500h generally comprises the switch 510, the switch 512, a block (or circuit) 514h, a block (or circuit) 516h and the inductor L. The T/R switch 500h may be a variation on the T/R switch 500 with the power detection integrated into the circuit 516h. The circuit 516h may be a variation of the impedance matching network 516 with the added power detection capability. The circuit 514h may be a variation of the impedance matching network 514. The inductor L may be connected between the circuit ground potential GND and a node connected to both the circuit 514h and the circuit 516h.

The impedance matching network 516h generally comprises a capacitor CD, a capacitor CE and a block (or circuit) 544h. The capacitor CD may implement a feed-through capacitor. The capacitor CD may provide the impedance matching network for the signal RXi. The capacitor CE may implement a sampling capacitor. The capacitor CE may sample a portion of the power in the signal RXi. The circuit 544h may implement a power detection circuit connected to the capacitor CE. The circuit 544h is generally operational to detect the power level of the RF signal received from the capacitor CE and present the detected power level in the signal PD.

The impedance matching network 514h generally comprises a capacitor CF. The capacitor CF may be configured to provide the asymmetrical impedance to the capacitor CD.

Figure 16:
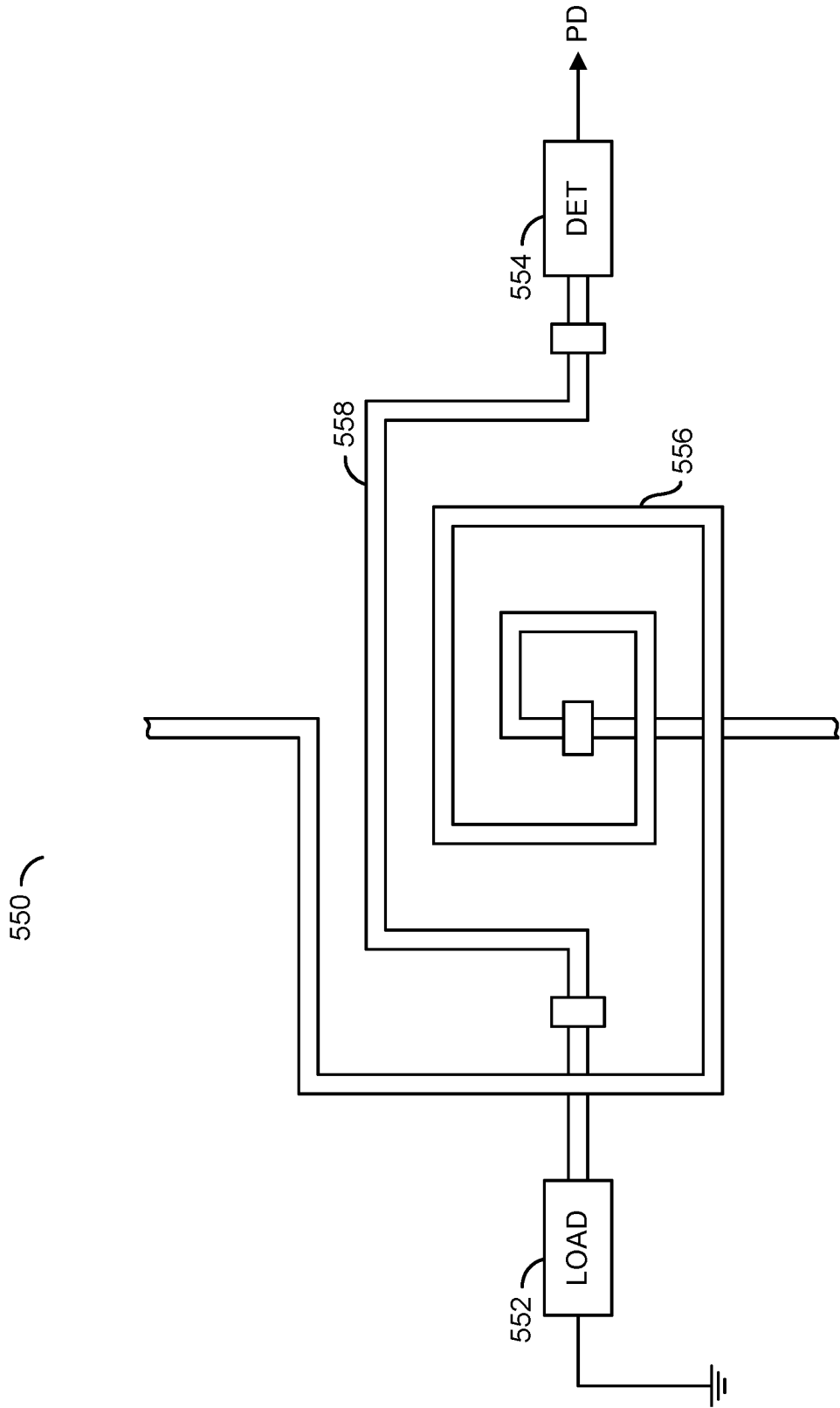
FIG. 16 is a diagram illustrating a device with an integrated power detection in accordance with an example embodiment of the invention.

Referring to FIG. 16, a diagram illustrating an implementation of a device 450 with an integrated power detection is shown in accordance with an example embodiment of the invention. The device 450 may be implemented in any of the impedance matching networks 514-514h and 516-516h. The device 450 generally comprises a load (or impedance) 452, a power detector circuit 454, an inductor 456 and a microstrip line 458 (or transmission line).

The inductor 456 is generally arranged as a coil inductor on two or more conductor (e.g., metal) layers. The microstrip line 458 may traverse the coils of the inductor 456 on one or more of the conductive layers. A close proximity of the microstrip line 458 and the coils of the inductor 456 may inductively couple a portion of the radio-frequency power passing through the inductor 456 into the microstrip line 458. The load 452 may be connected between one end of the microstrip line 458 and the circuit ground potential. The power detector circuit 454 may be connected to the other end of the microstrip line 458. The power detector circuit 454 may be operational to generate the signal PD based on the coupled power received from the microstrip line 458.

The functions and structures illustrated in the diagrams of FIGS. 1 to 16 may be designed, modeled, emulated, and/or simulated using one or more of a conventional general purpose processor, digital computer, microprocessor, microcontroller, distributed computer resources and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally embodied in a medium or several media, for example non-transitory storage media, and may be executed by one or more of the processors sequentially or in parallel.

Embodiments of the present invention may also be implemented in one or more of ASICs (application specific integrated circuits), FPGAs (field programmable gate arrays), PLDs (programmable logic devices), CPLDs (complex programmable logic device), sea-of-gates, ASSPs (application specific standard products), and integrated circuits. The circuitry may be implemented based on one or more hardware description languages. Embodiments of the present invention may be utilized in connection with flash memory, nonvolatile memory, random access memory, read-only memory, magnetic disks, floppy disks, optical disks such as DVDs and DVD RAM, magneto-optical disks and/or distributed storage systems.

Although embodiments of the invention have been described in the context of a 5G application, the present invention is not limited to 5G applications, but may also be applied in other high data rate wireless and wired communications applications where different rapid switching, multiple channel, and multiple user issues may exist. The present invention addresses concerns related to high speed wireless communications, mobile and stationary transceivers and point-to-point links. Future generations of wireless communications applications using radio frequency (RF), microwave, and millimeter-wave links can be expected to provide increasing speed, increasing flexibility, and increasing numbers of interconnections and layers. The present invention may also be applicable to wireless communications systems implemented in compliance with either existing (legacy, 2G, 3G, 4G) specifications or future specifications.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

The various signals described above are generally "on" (e.g., a digital HIGH, or 1) or "off" (e.g., a digital LOW, or 0). However, the particular polarities of the on (e.g., asserted) and off (e.g., de-asserted) states of the signals may be adjusted (e.g., reversed) accordingly to meet design criteria of a particular implementation.

The use of letters (e.g., 112a-112m, ADD1-ADD(X), RF1-RFN, etc.) intended to indicate that any number of the corresponding index may be implemented while staying within the scope of the invention. The letters should not be construed as requiring particular relationships or relative magnitudes between the various labels in which the letters are used. The number of elements specified using letters may be different or similar. In an example, the hard-wired address ADD1-ADD(X) may be implement as 6 bits while the number antenna input/outputs (or transceiver channels) RF1-RFN may be implemented as 4. In another example, the hard-wired address ADD1-ADD(X) may be implemented as six bits while the number antenna input/outputs (or transceiver channels) RF1-RFN may be implemented as eight.

While the invention has been particularly shown and described with reference to embodiments thereof, it will be understood by those skilled in the art that various changes in form and details may be made without departing from the scope of the invention.

The invention claimed is:

1. An apparatus comprising:
a transmit-receive switch circuit (i) connected between an input port, an output port, and a common port, and (ii) configured to switch a transmit radio-frequency signal from said input port to said common port in a transmit mode and a receive radio-frequency signal from said common port to said output port in a receive mode; and
a detector circuit (i) integrated within said transmit-receive switch and (ii) configured to generate a power detection signal in response to at least one of said transmit radio-frequency signal or said receive radio-frequency signal.

2. The apparatus according to claim 1, wherein said transmit-receive switch comprises (i) a coupler configured to generate a sample of at least one of said transmit radio-frequency signal and said receive radio-frequency signal, and (ii) said detector circuit is configured to generate said power detection signal in response to said sample.

3. The apparatus according to claim 2, wherein said coupler comprises a transformer.

4. The apparatus according to claim 2, wherein said coupler comprises a first transmission line and a second transmission line arranged in parallel to each other.

5. The apparatus according to claim 2, wherein said coupler comprises a coupled line coupler.

6. The apparatus according to claim 2, wherein said coupler comprises a capacitor.

7. The apparatus according to claim 2, wherein said coupler comprises a transmission line integrated into a coil inductor.

8. The apparatus according to claim 1, wherein said transmit-receive switch circuit comprises an impedance matching network connected between said input port and said common port and a shunt switch circuit configured to switch said input port and a circuit ground potential, and said detector circuit is integrated within said impedance matching network.

9. The apparatus according to claim 1, wherein said transmit-receive switch circuit comprises an impedance matching network connected between said output port and said common port and a shunt switch circuit configured to switch said output port and a circuit ground potential, and said detector circuit is integrated within said impedance matching network.

10. The apparatus according to claim 1, wherein:
   in said receive mode, said receive radio-frequency signal is directed from said common port through said output port to a low noise amplifier by placing a first switch circuit in a conducting state to couple said input port to a circuit ground potential and placing a second switch circuit in a non-conducting state; and
   in said transmit mode, said transmit radio-frequency signal is directed from a power amplifier through said input port to said common port by placing said first switch circuit in said non-conducting state and placing said second switch circuit in said conducting state to couple said output port to said circuit ground potential.

11. The apparatus according to claim 1, wherein said transmit radio-frequency signal and said receive radio-frequency signal each have a frequency in a range of 2 gigahertz to 44 gigahertz.

12. The apparatus according to claim 1, wherein said transmit-receive switch circuit and said detector circuit are configured to form part of a second generation (2G) wireless communication system, a third generation (3G) wireless communication system, a fourth generation (4G) wireless communication system or a fifth generation (5G) wireless communication system.

13. The apparatus according to claim 1, wherein said apparatus is configured for a radio frequency application comprising at least one of a base station, a wireless backhaul, a repeater, a community antenna television network, a macro cell, a micro cell, a pico cell, a femto cell, a mobile device, a portable handheld device or any combination thereof.

14. A method for integrated power detection, comprising the steps of:
   generating a power detection signal in response to a radio-frequency signal in a switch leg of a transmit-receive switch connected between an input port, an output port, and a common port, wherein said radio-frequency signal is a transmit signal or a receive signal;
   coupling an antenna to said common port;
   switching said input port to a circuit ground potential using a first switch circuit in a receive mode; and
   switching said output port to said circuit ground potential using a second switch circuit in a transmit mode.

15. The method according to claim 14, further comprising the steps of:
   generating a sample of said radio-frequency signal; and
   generating said power detection signal in response to said sample.

16. The method according to claim 14, wherein:
   in said receive mode, said receive signal is directed from said common port through said output port to a low noise amplifier by placing said first switch circuit in a conducting state to couple said input port to said circuit ground potential and placing said second switch circuit in a non-conducting state; and
   in said transmit mode, said transmit signal is directed from a power amplifier through said input port to said common port by placing said first switch circuit in said non-conducting state and placing said second switch circuit in said conducting state to couple said output port to said circuit ground potential.

17. The method according to claim 14, wherein the steps are performed in a second generation (2G) wireless communication system, a third generation (3G) wireless communication system, a fourth generation (4G) wireless communication system or a fifth generation (5G) wireless communication system.

18. The method according to claim 14, wherein the steps are configured for a radio frequency application comprising at least one of a base station, a wireless backhaul, a repeater, a community antenna television network, a macro cell, a micro cell, a pico cell, a femto cell, a mobile device, a portable handheld device or any combination thereof.

19. An apparatus comprising:
   a transmit-receive switch circuit (i) connected between an input port, an output port, and a common port, and (ii) comprising a first impedance matching network connected between said input port and said common port, a second impedance matching network connected between said output port and said common port, a first switch circuit configured to switch said input port and a circuit ground potential, and a second switch circuit configured to switch said output port and said circuit ground potential; and
   a detector circuit (i) integrated with at least one of said first impedance matching network and said second impedance matching network, and (ii) configured to generate a power detection signal in response to at least one of a transmit radio-frequency signal or a receive radio-frequency signal.

20. The apparatus according to claim 19, wherein said first impedance matching network and said second impedance matching network present asymmetrical impedances.

* * * * *